(12) United States Patent
Chang et al.

(10) Patent No.: US 12,464,241 B2
(45) Date of Patent: Nov. 4, 2025

(54) SHIFTABLE IMAGE SENSOR MODULE, CAMERA MODULE AND ELECTRONIC DEVICE

(71) Applicant: LARGAN PRECISION CO., LTD., Taichung (TW)

(72) Inventors: Lin-An Chang, Taichung (TW); Wen-Yu Tsai, Taichung (TW); Jyun-Jia Cheng, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 179 days.

(21) Appl. No.: 18/360,928

(22) Filed: Jul. 28, 2023

(65) Prior Publication Data
US 2024/0048845 A1 Feb. 8, 2024

Related U.S. Application Data

(60) Provisional application No. 63/370,286, filed on Aug. 3, 2022.

(51) Int. Cl.
*H04N 23/68* (2023.01)
*H04N 23/54* (2023.01)

(52) U.S. Cl.
CPC ........... *H04N 23/687* (2023.01); *H04N 23/54* (2023.01)

(58) Field of Classification Search
CPC ...... H04N 23/687; H04N 23/54; H04N 23/55; H04N 23/50; H04N 23/52
See application file for complete search history.

(56) References Cited

U.S. PATENT DOCUMENTS

| | | | |
|---|---|---|---|
| 9,087,759 B1 * | 7/2015 | Yang | H10F 39/018 |
| 10,071,903 B2 | 9/2018 | Liu | |
| 10,924,675 B2 | 2/2021 | Hubert | |
| 10,965,848 B1 | 3/2021 | Ba-Tis | |
| 11,223,756 B1 * | 1/2022 | Sharma | G03B 30/00 |
| 2006/0035486 A1 * | 2/2006 | Higuchi | H01R 12/52 439/66 |
| 2011/0244734 A1 * | 10/2011 | Niitsu | H01R 12/00 439/682 |
| 2016/0227117 A1 * | 8/2016 | Gutierrez | H02N 1/008 |
| 2020/0036898 A1 | 1/2020 | Kuo | |

(Continued)

FOREIGN PATENT DOCUMENTS

CN 207571371 U 7/2018
WO 2021161976 A1 8/2021

*Primary Examiner* — Padma Haliyur
(74) *Attorney, Agent, or Firm* — McClure, Qualey & Rodack, LLP

(57) ABSTRACT

A shiftable image sensor module includes an image sensor and a shiftable circuit element. The shiftable circuit element includes a movable portion, a fixed portion, an elastic connecting portion and a conducting wire portion. The image sensor is disposed on the movable portion. The fixed portion is disposed around the movable portion. The elastic connecting portion is connected to the movable portion and the fixed portion. The conducting wire portion includes a plurality of conducting wire units, and each of the conducting wire units is electrically connected from the fixed portion to the image sensor. Each of the conducting wire units includes at least one conductor line, and the conductor line includes an air insulation layer located on an outer surface of the conductor line.

19 Claims, 27 Drawing Sheets

(56) References Cited

U.S. PATENT DOCUMENTS

| | | |
|---|---|---|
| 2020/0099317 A1 | 3/2020 | Wang |
| 2020/0336639 A1 | 10/2020 | Hu |
| 2021/0218896 A1 | 7/2021 | Smyth |
| 2021/0318593 A1 | 10/2021 | Sharma |
| 2021/0409604 A1* | 12/2021 | Sharma ................ H04N 23/687 |
| 2022/0011537 A1 | 1/2022 | Chang |
| 2022/0014677 A1 | 1/2022 | Smyth |
| 2022/0019128 A1 | 1/2022 | Ng |
| 2022/0091430 A1 | 3/2022 | Xu |
| 2022/0103744 A1 | 3/2022 | Hsu |
| 2022/0124249 A1 | 4/2022 | Sharma |
| 2022/0232165 A1 | 7/2022 | Huang |
| 2022/0345598 A1* | 10/2022 | Park ..................... G02B 27/646 |
| 2023/0156911 A1* | 5/2023 | Tanaka ..................... G03B 5/00 348/208.11 |
| 2024/0406527 A1* | 12/2024 | Birnbaum .............. H04N 23/45 |

* cited by examiner

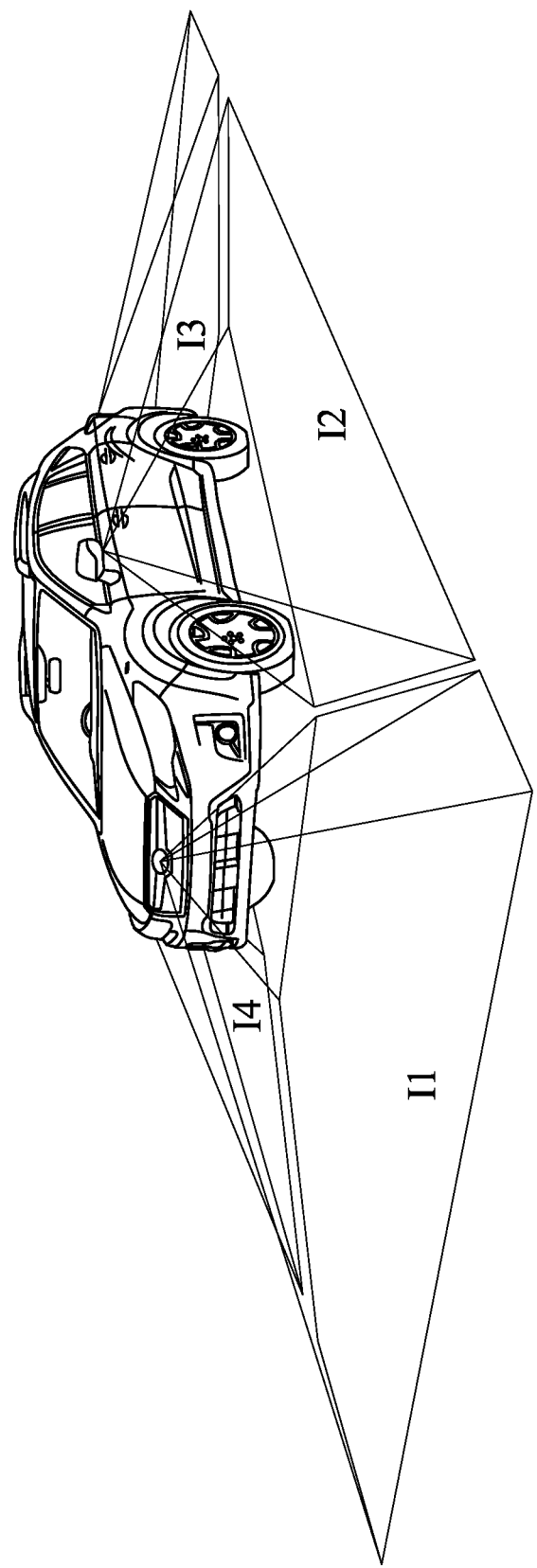

SHIFTABLE IMAGE SENSOR MODULE, CAMERA MODULE AND ELECTRONIC DEVICE

RELATED APPLICATIONS

This application claims priority to U.S. Provisional Application Ser. No. 63/370,286, filed Aug. 3, 2022, which is herein incorporated by reference.

BACKGROUND

Technical Field

The present disclosure relates to a shiftable image sensor module and a camera module. More particularly, the present disclosure relates to a shiftable image sensor module and a camera module applicable to portable electronic devices.

Description of Related Art

In recent years, portable electronic devices have developed rapidly. For example, intelligent electronic devices and tablets have been filled in the lives of modern people, and camera modules mounted on the portable electronic devices have also prospered. However, as technology advances, the quality requirements of the electronic devices and the camera modules thereof are becoming higher and higher. Therefore, the development of a shiftable image sensor module that can provide the electrical signal transmission with a higher signal-to-noise ratio has become an important and urgent issue in the industry.

SUMMARY

According to one aspect of the present disclosure, a shiftable image sensor module includes an image sensor and a shiftable circuit element. The shiftable circuit element includes a movable portion, a fixed portion, an elastic connecting portion and a conducting wire portion. The image sensor is disposed on the movable portion. The fixed portion is disposed around the movable portion. The elastic connecting portion is connected to the movable portion and the fixed portion, so that the movable portion is able to move relatively to the fixed portion, and is configured to provide a restoring force for the movable portion to return to an initial position. The conducting wire portion includes a plurality of conducting wire units, and each of the conducting wire units is electrically connected from the fixed portion to the image sensor. Each of the conducting wire units includes at least one conductor line, and the conductor line includes an air insulation layer located on an outer surface of the conductor line.

According to another aspect of the present disclosure, a camera module includes the shiftable image sensor module of the aforementioned aspect, an imaging lens module and an optical image stabilization driver. The imaging lens module is configured for imaging an imaging light on the image sensor of the shiftable image sensor module. The optical image stabilization driver is configured for providing a driving force for the image sensor to move relatively to the imaging lens module.

According to still another aspect of the present disclosure, an electronic device includes the camera module of the aforementioned aspect.

BRIEF DESCRIPTION OF THE DRAWINGS

The present disclosure can be more fully understood by reading the following detailed description of the embodiment, with reference made to the accompanying drawings as follows:

FIG. 5C is still another schematic view of the vehicle instrument according to the 5th embodiment in FIG. 5A.

DETAILED DESCRIPTION

Figure 1A:
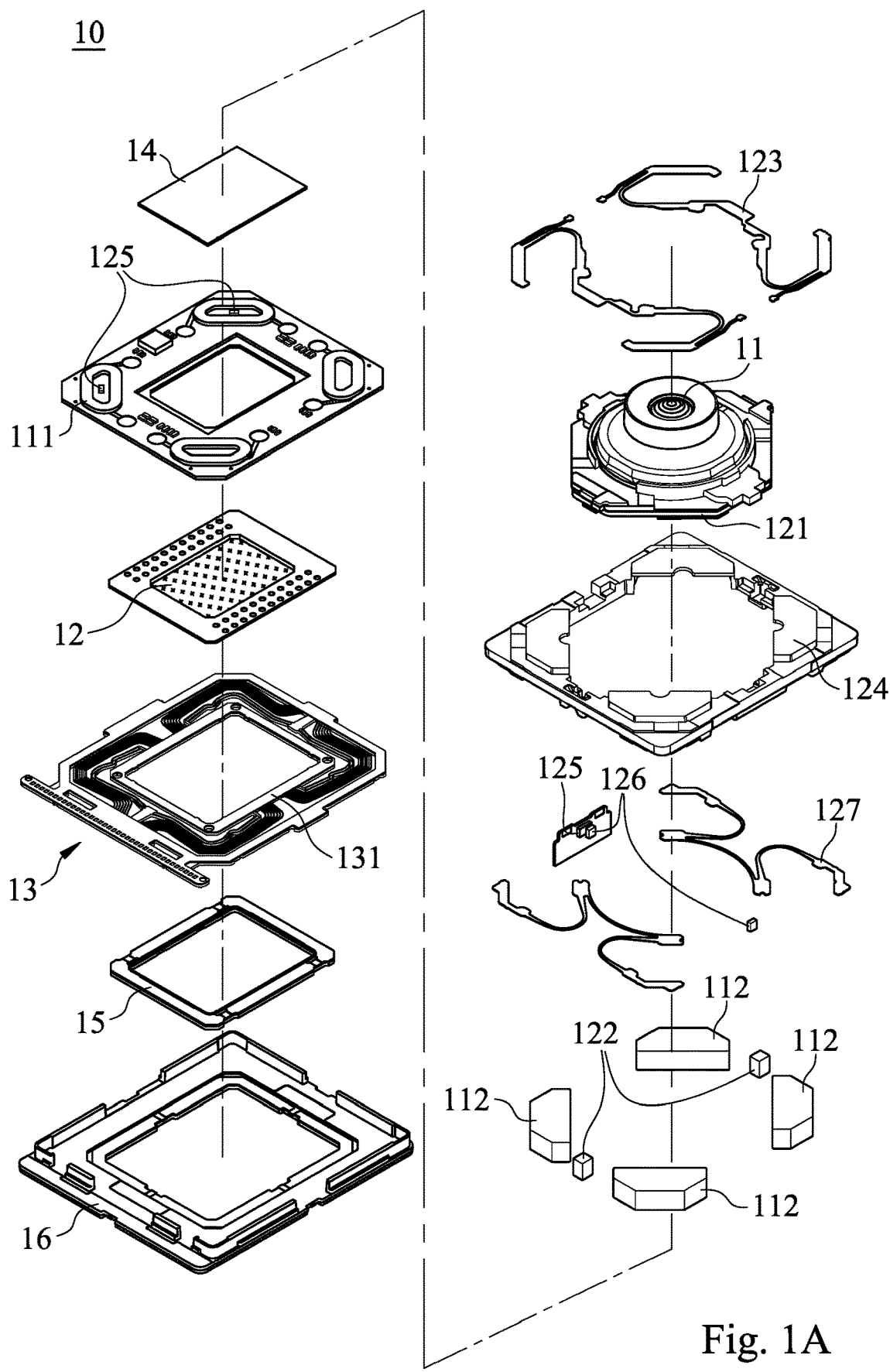
FIG. 1A is an exploded view of a camera module according to the 1st embodiment of the present disclosure.

A shiftable image sensor module of the present disclosure is provided. The shiftable image sensor module includes an image sensor and a shiftable circuit element. The shiftable circuit element includes a movable portion, a fixed portion, an elastic connecting portion and a conducting wire portion. The image sensor is disposed on the movable portion. The fixed portion is disposed around (surrounds) the movable portion. The elastic connecting portion is connected to the movable portion and the fixed portion, so that the movable portion is able to move relatively to the fixed portion, and is configured to provide a restoring force for the movable portion to return to an initial position, and the initial position is a position where the movable portion is located and has not moved relatively to the fixed portion. The conducting wire portion includes a plurality of conducting wire units, and each of the conducting wire units is electrically connected from the fixed portion to the image sensor (i.e., electrically connected between the fixed portion and the image sensor). Each of the conducting wire units includes at least one conductor line, and the conductor line includes an air insulation layer located on an outer surface of the conductor line (an air insulation layer is located on an outer surface of the conductor line).

The conductor lines covered by the air insulation layers on the outer surfaces thereof of the present disclosure act as the conducting wire units of the shiftable circuit element, so that it is favorable for enhancing the durability of the conducting wire units, keeping the low interference of the conducting wire portion while driving the movable portion, and further providing the electrical signal transmission with a higher signal-to-noise ratio.

In detail, the conducting wire portion may be connected to the movable portion and the fixed portion by welding, and the conducting wire portion may be an integral structure extending from the movable portion and the fixed portion. The conductor lines may be made of conductive materials to be used for transmitting electrical signals. The air insulation layers can be used for preventing the conductor lines from oxidation, protecting the conductor lines from breakage, and further preventing from short circuit.

Each of the air insulation layers may include at least one of a metal oxide material and a semiconductor oxide material. Therefore, it is more effective to isolate the conductor lines from the outside air. Specifically, the material of the air insulation layers may be chromium oxide, titanium dioxide ($TiO_2$), silicon dioxide ($SiO_2$), or aluminum oxide ($Al_2O_3$), but is not limited thereto. Furthermore, the chromium oxide can further improve the ductility of the conductor lines, thereby preventing the conductor lines from breakage.

Each of the air insulation layers may include a polymer material, and the polymer material may be parylene, but is not limited thereto. Specifically, the polymer material is advantageous in faster deposition speed and higher coating efficiency, so as to provide the feasibility of mass production.

The conductor line of each of the conducting wire units may be made of a conductor material, and the conductor material may be a metal material. Therefore, the material of the conductor lines is featured with high ductility and better electrical conductivity. Specifically, the metal material may be copper (Cu), silver (Ag), aluminum (Al), or gold (Au), but is not limited thereto. Alternatively, the conductor material may be an alloy material. Therefore, the production cost can be reduced while good electrical properties being maintained. Specifically, the alloy material may be a copper alloy, with copper as the main body doped with at least one of iron (Fe), zinc (Zn), tin (Sn), aluminum (Al), nickel (Ni), titanium (Ti) and cobalt (Co), but is not limited thereto. For example, the copper alloy may include 99% copper and 1% titanium. Furthermore, a main body of each of the conducting wire units may be completely made of the alloy material.

Each of the conducting wire units may further include an insulating layer, and the conductor line of each of the conducting wire units is disposed on the insulating layer. Therefore, the sufficient supports can be provided for the conducting wire units to prevent the conducting wire units from deformation and loosening. Furthermore, the insulating layer may be made of polyimide (PI), but is not limited thereto.

The conductor line of each of the conducting wire units may form a conductor line layer on the insulating layer. Therefore, manufacturing by a layered/laminated manner is advantageous in enhancing the mass production efficiency in manufacturing.

A connection layer may be disposed between the insulating layer and the conductor line layer of each of the conducting wire units, and the connection layer is configured for connecting the insulating layer and the conductor line layer. Therefore, the adhesion between the insulating layer and the conductor line layer can be improved, so that the conductor line layer can be prevented from peeling off, and the connection layer can provide the connection matching between materials. In detail, the connection layer may be made of at least one of nickel, aluminum oxide, chromium oxide, palladium (Pd), gold and platinum (Pt), but is not limited thereto.

The movable portion may be able to move relatively to the fixed portion on a plane parallel to the image sensor. Therefore, the effect of the optical image stabilization can be achieved.

The shiftable image sensor module may further include a movable base, which is disposed on the movable portion and may be a plastic anti-collision buffer mechanism. Therefore, the movable portion can be limited to move within a specific range, so as to prevent the conducting wire portion and the elastic connecting portion from excessive deformation, and further improve the product reliability.

There may be no physical contact between the conducting wire units of the conducting wire portion. Therefore, it is favorable for providing a more stable transmission of the electrical signals and preventing from short circuit.

There may be no physical contact between the elastic connecting portion and the conducting wire portion. The separate design between the elastic connecting portion and the conducting wire portion is favorable for preventing from mechanism interference and avoiding errors during signal transmission.

The elastic connecting portion may include at least one bent section, and the bent section is disposed between two ends of the elastic connecting portion. Therefore, it is advantageous in balancing the movement amount on a plane and improving the reliability of the elastic element.

An outer periphery of each of the conducting wire units may be completely covered by a corresponding one of the air insulation layers. The conducting wire units can be ensured to be completely isolated from the outside air by completely covering.

Each of the air insulation layers may be a visible light absorbing layer. Therefore, the occurring probability of the stray light can be reduced. In detail, the appearance of each of the air insulation layers may be a black surface for absorbing the visible light, so as to avoid the reflected light.

When a total thickness of the shiftable circuit element is T, the following condition may be satisfied: 0.10 mm<T<1.35 mm. Therefore, it is favorable for providing the feasibility of the miniaturization of the shiftable image sensor module.

At least four of the conducting wire units are disposed adjacently. When a spacing between each adjacent two of the conducting wire units is Dc, the following condition may be satisfied: 0.01 mm<Dc<0.25 mm. Therefore, it ensures that the conducting wire units will not collide with each other when the shiftable image sensor module moves. Furthermore, the following condition may be satisfied: 0.02 mm<Dc<0.20 mm. Therefore, a more flexible wiring design can be obtained to reduce the space ratio of the conducting wire portion, so as to achieve the miniaturization of the module. Furthermore, there may be an air gap between each adjacent two of the conducting wire units, so that each of the conducting wire units can be independently arranged, thereby reducing the signal interference between the conductor lines.

Each of the aforementioned features of the shiftable image sensor module can be utilized in various combinations for achieving the corresponding effects.

A camera module of the present disclosure is provided. The camera module includes the aforementioned shiftable image sensor module, an imaging lens module and an optical image stabilization driver. The imaging lens module is configured for imaging an imaging light on the image sensor of the shiftable image sensor module. The optical image stabilization driver is configured for providing a driving force for the image sensor to move relatively to the imaging lens module. In detail, the optical image stabilization driver may include an optical image stabilization coil and one or more magnets disposed correspondingly to the optical image stabilization coil. The optical image stabilization coil may be a kind of wafer-level coil (chip coil), which is a micro-coil manufactured from a wafer, but the present disclosure is not limited thereto. Furthermore, the camera module may further include an auto-focus driving assembly. The auto-focus driving assembly may include an auto-focus coil and one or more magnets disposed correspondingly to the auto-focus coil for providing a driving force for the imaging lens module to move relatively to the image sensor.

An electronic device of the present disclosure is provided. The electronic device includes the aforementioned camera module.

According to the aforementioned aspects, specific embodiments and examples are provided, and illustrated via figures.

1st Embodiment

With reference to FIG. 1A, FIG. 1A is an exploded view of a camera module 10 according to the 1st embodiment of the present disclosure. In FIG. 1A, the camera module 10 includes a shiftable image sensor module (its reference numeral is omitted), an imaging lens module 11, an optical image stabilization driver (its reference numeral is omitted), an auto-focus driving assembly (its reference numeral is omitted) and a filter 14.

The shiftable image sensor module includes an image sensor 12, a shiftable circuit element 13, a movable base 15 and a fixed base 16. The image sensor 12 is disposed on the shiftable circuit element 13, but the shiftable circuit element provided in the present disclosure may be cooperated with another image sensor, and is not limited to the 1st embodiment. The imaging lens module 11 is configured for imaging an imaging light on the image sensor 12 of the shiftable image sensor module. The optical image stabilization driver is configured for providing a driving force for the image sensor 12 to move relatively to the imaging lens module 11. The filter 14 is disposed on an image side of the imaging lens module 11 and an object side of the image sensor 12. The movable base 15 may be a plastic anti-collision buffer mechanism.

The optical image stabilization driver may include at least one optical image stabilization coil 111 and a plurality of fixed magnets 112, which are disposed correspondingly to the optical image stabilization coil 111. Furthermore, the optical image stabilization coil 111 may be a kind of wafer-level coil, that is, the optical image stabilization coil 111 may be manufactured from a wafer, but is not limited thereto. In the 1st embodiment, a number of the optical image stabilization coil 111 is four, and a number of the fixed magnets 112 is four, but not limited thereto.

The auto-focus driving assembly may include an auto-focus coil 121, a plurality of fixed magnets 122, at least one upper spring sheet 123, a magnet holder 124, a plurality of sensing elements 125, a plurality of sensing magnets 126 and at least one lower spring sheet 127. The fixed magnets 122 are disposed correspondingly to the auto-focus coil 121 for providing a driving force for the imaging lens module 11 to move relatively to the image sensor 12. The upper spring sheet 123 and the lower spring sheet 127 are arranged on the object side and the image side, respectively, of the imaging lens module 11, and the upper spring sheet 123 and the lower spring sheet 127 are arranged oppositely. There is no relative displacement between the magnet holder 124 and the fixed base 16, and the fixed magnets 112, 122 may be fixed on the magnet holder 124. The sensing elements 125 are disposed correspondingly to a part of the optical image stabilization coils 111 and a part of the sensing magnets 126, respectively, and two of the sensing elements 125 are configured for detecting the relative positions of the two sensing magnets 126 corresponding thereto. In the 1st embodiment, a number of the fixed magnets 122 is two, a number of the sensing elements 125 is three, and a number of the sensing magnets 126 is two, but not limited thereto.

Figure 1B:
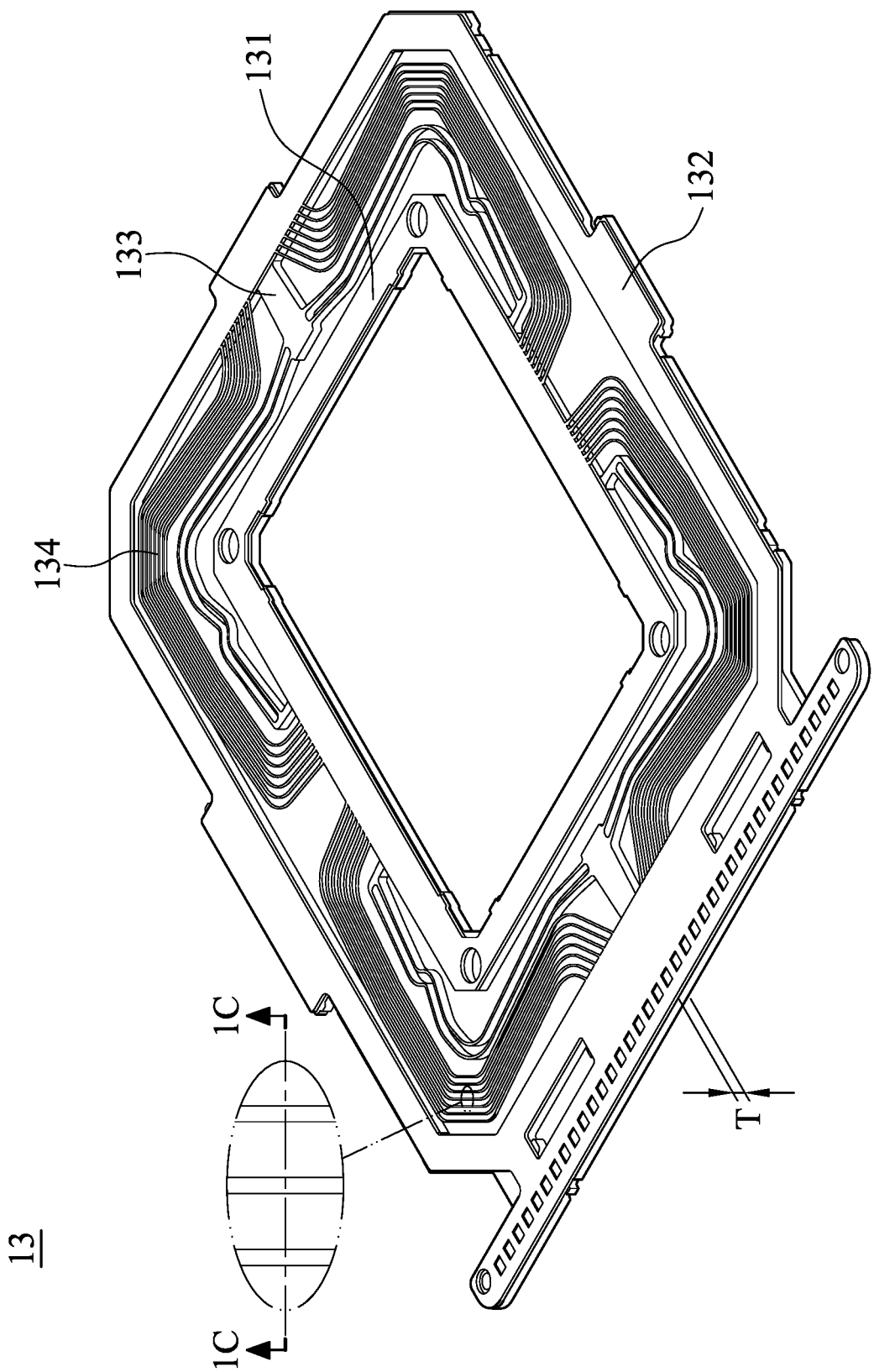
FIG. 1B is a three-dimensional view of a shiftable circuit element of the 1st example of the 1st embodiment in FIG. 1A.
Figure 1C:
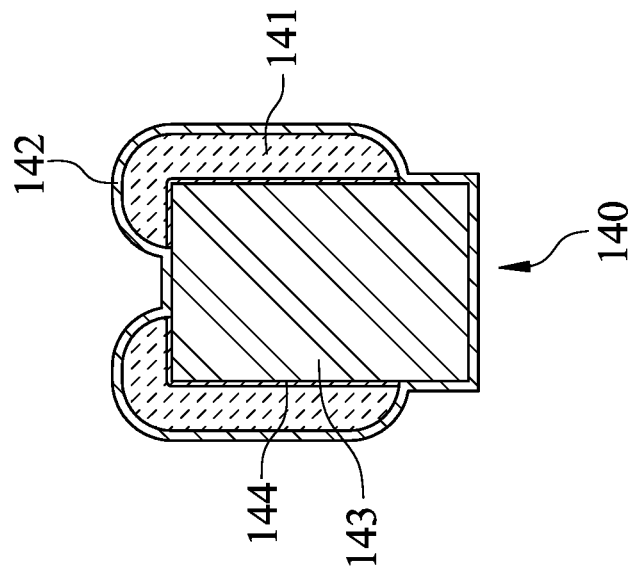
FIG. 1C is a cross-sectional view along line 1C-1C of a conducting wire unit in FIG. 1B of the 1st example of the 1st embodiment.
Figure 1C:
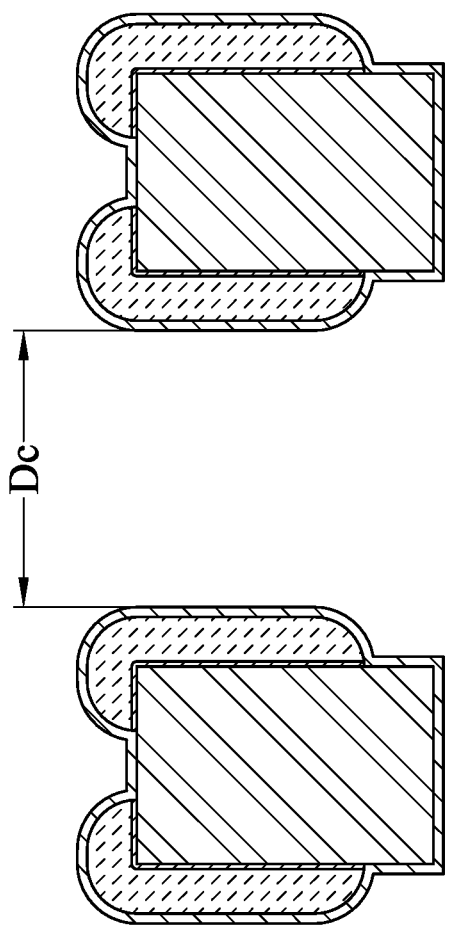
Figure 1D:
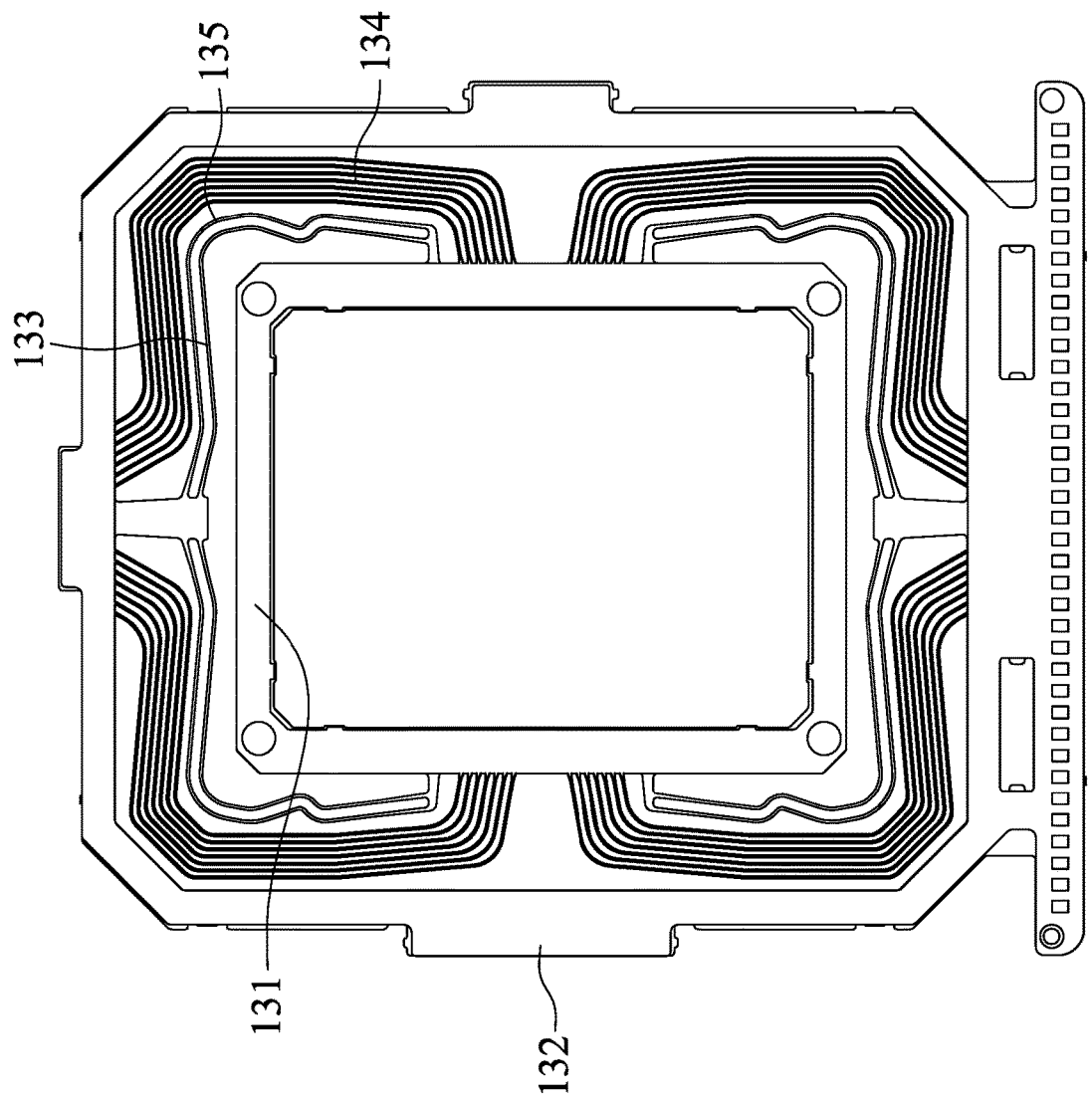
FIG. 1D is a planar view of the shiftable circuit element of the 1st example of the 1st embodiment in FIG. 1A.
Figure 1E:
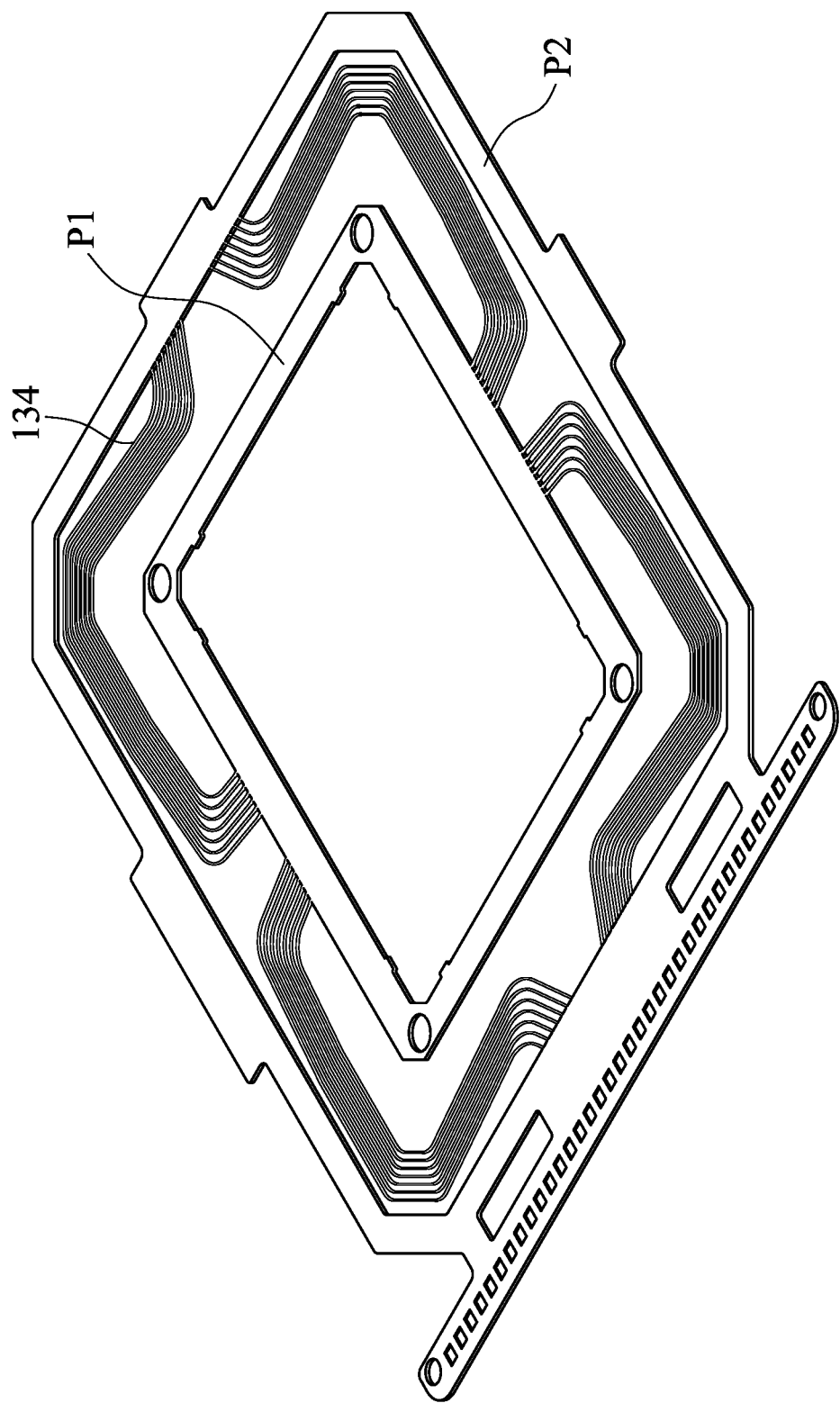
FIG. 1E is a partial view of the shiftable circuit element of the 1st example of the 1st embodiment in FIG. 1A.
Figure 1F:
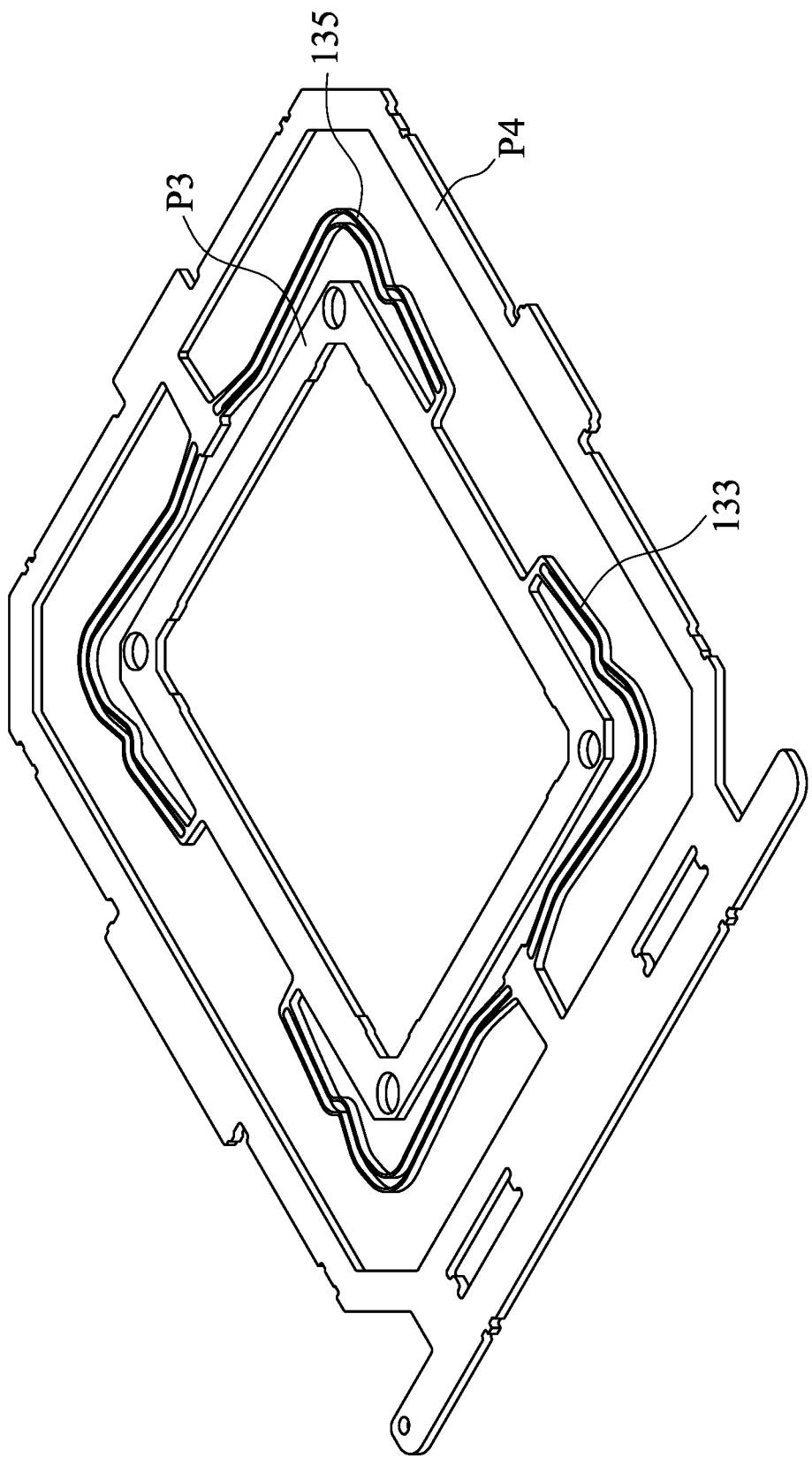
FIG. 1F is another partial view of the shiftable circuit element of the 1st example of the 1st embodiment in FIG. 1A.

With reference to FIG. 1B to FIG. 1F, FIG. 1B is a three-dimensional view of the shiftable circuit element 13 of the 1st example of the 1st embodiment in FIG. 1A, FIG. 1C is a cross-sectional view along line 1C-1C of a conducting wire unit 140 in FIG. 1B of the 1st example of the 1st embodiment, FIG. 1D is a planar view of the shiftable circuit element 13 of the 1st example of the 1st embodiment in FIG. 1A, FIG. 1E is a partial view of the shiftable circuit element 13 of the 1st example of the 1st embodiment in FIG. 1A, and FIG. 1F is another partial view of the shiftable circuit element 13 of the 1st example of the 1st embodiment in FIG. 1A. In FIG. 1A to FIG. 1F, the shiftable circuit element 13 includes a movable portion 131, a fixed portion 132, an elastic connecting portion 133 and a conducting wire portion 134. The image sensor 12 and the movable base 15 are disposed on the movable portion 131. The movable portion 131 can be limited to move within a specific range resulted from the movable base 15 disposed on the movable portion 131, so as to prevent the conducting wire portion 134 and the elastic connecting portion 133 from excessive deformation, and further improve the product reliability. The fixed portion 132 is disposed around the movable portion 131. The elastic connecting portion 133 is connected to the movable portion 131 and the fixed portion 132, so that the movable portion 131 is able to move relatively to the fixed portion 132, and is configured to provide a restoring force for the movable portion 131 to return to an initial position. There is no physical contact between the elastic connecting portion 133 and the conducting wire portion 134. The separate design between the elastic connecting portion 133 and the conducting wire portion 134 is favorable for preventing from mechanism interference and avoiding errors during signal transmission. The movable portion 131 may be able to move relatively to the fixed portion 132 on a plane parallel to the image sensor 12, so that the effect of the optical image stabilization can be achieved. The conducting wire portion 134 includes a plurality of conducting wire units 140, and each of the conducting wire units 140 is electrically connected from the fixed portion 132 to the image sensor 12. There is no physical contact between the conducting wire units 140 of the conducting wire portion 134, so that it is favorable for providing a more stable transmission of the electrical signals and preventing from short circuit.

In FIG. 1D and FIG. 1F, the elastic connecting portion 133 may include at least one bent section 135, and the bent section 135 is disposed between two ends of the elastic connecting portion 133. Therefore, it is advantageous in balancing the movement amount on a plane and improving the reliability of the elastic element.

In FIG. 1E and FIG. 1F, the movable portion 131 has an electrical signal transmission section P1 and an elastic support section P3, and the fixed portion 132 has an electrical signal transmission section P2 and an elastic support section P4. The conducting wire portion 134 may be an integral structure extending from the movable portion 131 and the fixed portion 132, that is, the conducting wire units 140 are integral structures extending from the electrical signal transmission sections P1, P2, so that the electrical signals can be transmitted between the movable portion 131 and the fixed portion 132. The elastic support sections P3, P4 are configured for connecting to the elastic connecting portion 133 to provide supports for the fixed portion 132 and the movable portion 131, and further provide the movable portion 131 in one degree of freedom on the plane and prevent the conducting wire portion 134 from damage.

Moreover, the electrical signal transmission sections P1, P2 can be used to transmit electrical signals of the image sensor 12, transmit electrical signals of the optical image stabilization coils 111, and also transmit electrical signals of the sensing elements 125.

In FIG. 1C, each of the conducting wire units 140 includes at least one conductor line 141, and the conductor line 141 includes an air insulation layer 142 located on an outer surface of the conductor line 141. Specifically, the conductor lines 141 covered by the air insulation layers 142 on the outer surfaces thereof act as the conducting wire units 140 of the shiftable circuit element 13, so that it is favorable for enhancing the durability of the conducting wire units 140, keeping the low interference of the conducting wire portion 134 while driving the movable portion 131, and further providing the electrical signal transmission with a higher signal-to-noise ratio.

An outer periphery of each of the conducting wire units 140 may be completely covered by a corresponding one of the air insulation layers 142, so that the conducting wire units 140 can be ensured to be completely isolated from the outside air. The air insulation layers 142 can be used for preventing the conductor lines 141 from oxidation, protecting the conductor lines 141 from breakage, and further preventing from short circuit. Furthermore, each of the air insulation layers 142 may be a visible light absorbing layer, so that the occurring probability of the stray light can be reduced. The appearance of each of the air insulation layers 142 may be a black surface for absorbing the visible light, so as to avoid the reflected light.

Each of the conducting wire units 140 may further include an insulating layer 143, and the conductor line 141 of each of the conducting wire units 140 is disposed on the insulating layer 143. Therefore, the sufficient supports can be provided for the conducting wire units 140 to prevent the conducting wire units 140 from deformation and loosening. Furthermore, the conductor line 141 of each of the conducting wire units 140 forms a conductor line layer (its reference numeral is omitted) on the insulating layer 143. A connection layer 144 is disposed between the insulating layer 143 and the conductor line layer of each of the conducting wire units 140, and the connection layer 144 is configured for connecting the insulating layer 143 and the conductor line layer. Therefore, manufacturing by a layered/laminated manner is advantageous in enhancing the mass production efficiency in manufacturing. The adhesion between the insulating layer 143 and the conductor line layer can be improved through the connection layer 144, so that the conductor line layer can be prevented from peeling off, and the connection layer 144 can provide the connection matching between materials. In detail, the connection layer 144 may be made of at least one of nickel, aluminum oxide, chromium oxide, palladium, gold and platinum, but is not limited thereto.

Each of the air insulation layers 142 may include at least one of a metal oxide material and a semiconductor oxide material. The material of the air insulation layers 142 may be chromium oxide, titanium dioxide, silicon dioxide, or aluminum oxide, but is not limited thereto. Therefore, it is more effective to isolate the conductor lines 141 from the outside air. Furthermore, the chromium oxide can further improve the ductility of the conductor lines 141, thereby preventing the conductor lines 141 from breakage.

Each of the air insulation layers 142 may include a polymer material, and the polymer material may be parylene, but is not limited thereto. Specifically, the polymer material is advantageous in faster deposition speed and higher coating efficiency, so as to provide the feasibility of mass production.

The conductor line 141 of each of the conducting wire units 140 may be made of a conductor material, and the conductor lines 141 can be configured for transmitting electrical signals. The conductor material may be a metal material, and the metal material may be copper, silver, aluminum, or gold, but is not limited thereto. Therefore, the material of the conductor lines 141 is featured with high ductility and better electrical conductivity. Alternatively, the conductor material may be an alloy material, and the alloy material may be a copper alloy, with copper as the main body doped with at least one of iron, zinc, tin, aluminum, nickel, titanium and cobalt, but is not limited thereto. For example, the copper alloy may include 99% copper and 1% titanium. Therefore, the production cost can be reduced while good electrical properties being maintained.

In the 1st example of the 1st embodiment, the insulating layer 143 is a main body of each of the conducting wire units 140 and made of polyimide, the conductor lines 141 are made of copper, the connecting layers 144 are made of nickel, and the air insulation layers 142 are made of chromium oxide, but the present disclosure is not limited thereto.

In FIG. 1B and FIG. 1C, a total thickness of the shiftable circuit element 13 is T, at least four of the conducting wire units 140 are disposed adjacently, a spacing between each adjacent two of the conducting wire units 140 is Dc, and the values of the aforementioned parameters are listed in the following TABLE 1A.

TABLE 1A

| T (mm) | 0.8 | Dc (mm) | 0.06 |
|---|---|---|---|

Figure 1G:
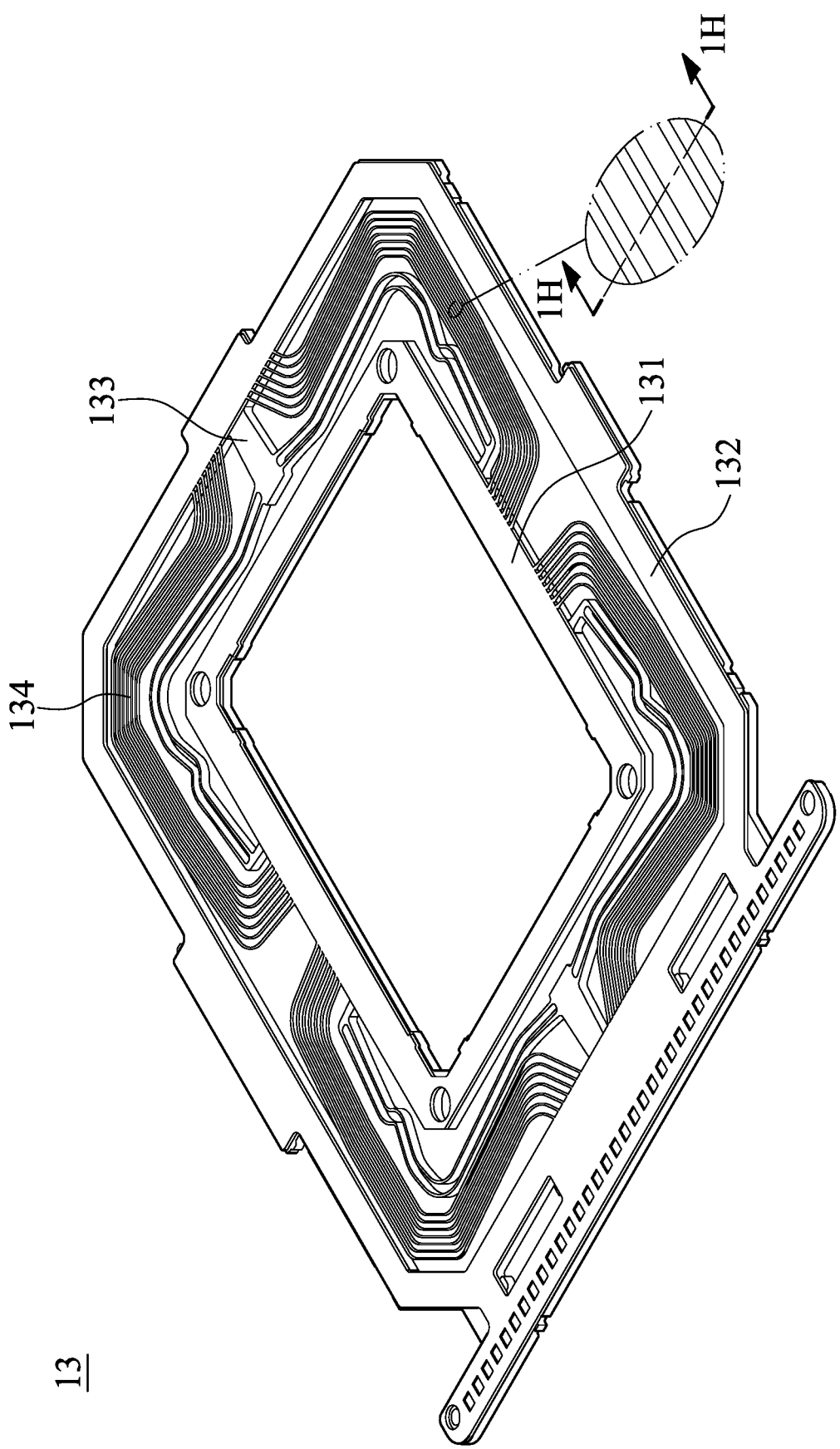
FIG. 1G is a three-dimensional view of the shiftable circuit element of the 2nd example of the 1st embodiment in FIG. 1A.
Figure 1H:
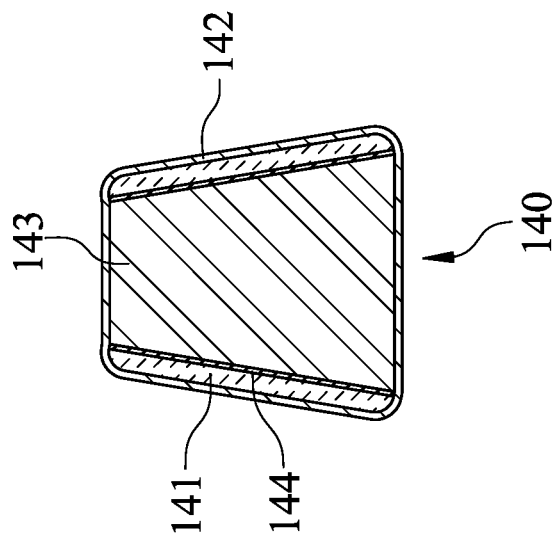
FIG. 1H is a cross-sectional view along line 1H-1H of the conducting wire unit in FIG. 1G of the 2nd example of the 1st embodiment.
Figure 1H:
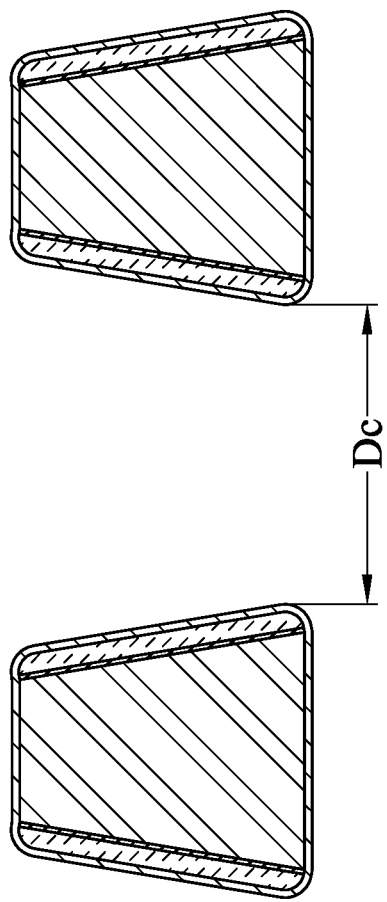

With reference to FIG. 1G and FIG. 1H, FIG. 1G is a three-dimensional view of the shiftable circuit element 13 of the 2nd example of the 1st embodiment in FIG. 1A, and FIG. 1H is a cross-sectional view along line 1H-1H of the conducting wire unit 140 in FIG. 1G of the 2nd example of the 1st embodiment. In FIG. 1G and FIG. 1H, the insulating layer 143 is a main body of each of the conducting wire units 140 and made of polyimide, the conductor lines 141 are made of silver, the connecting layers 144 are made of aluminum oxide, and the air insulation layers 142 are made of silicon dioxide, but the present disclosure is not limited thereto.

In FIG. 1H, at least four of the conducting wire units 140 are disposed adjacently, a spacing between each adjacent two of the conducting wire units 140 is Dc, and the value of the aforementioned parameter is listed in the following TABLE 1B.

TABLE 1B

| Dc (mm) | 0.07 |
|---|---|

Figure 1I:
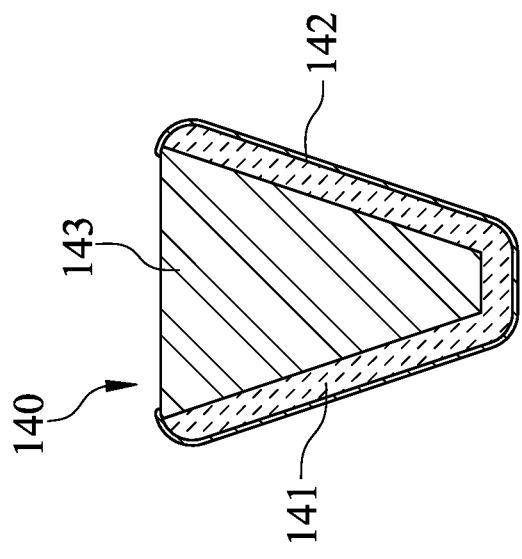
FIG. 1I is a cross-sectional view of the conducting wire unit in FIG. 1G of the 3rd example of the 1st embodiment.
Figure 1I:
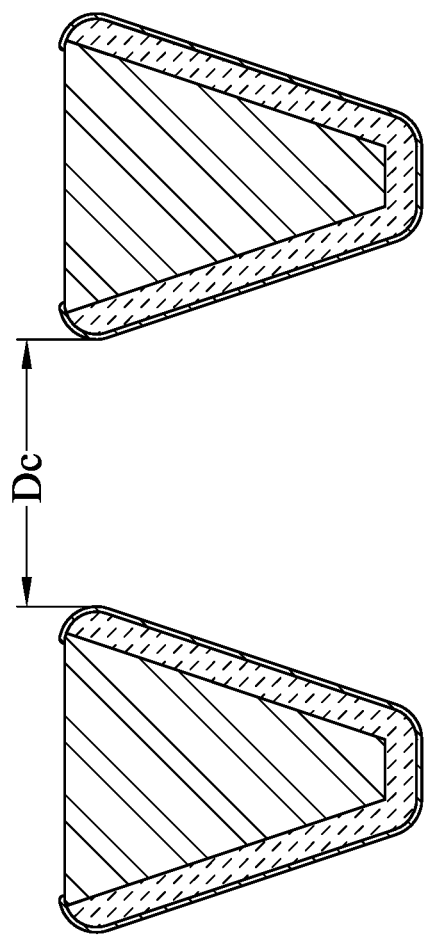

With reference to FIG. 1I, FIG. 1I is a cross-sectional view of the conducting wire unit 140 in FIG. 1G of the 3rd example of the 1st embodiment. In FIG. 1I, the insulating layer 143 is a main body of each of the conducting wire units 140 and made of polyimide, the conductor lines 141 are made of aluminum, the connecting layers 144 are made of palladium, and the air insulation layers 142 are made of parylene, but the present disclosure is not limited thereto.

In the 3rd example of the 1st embodiment, at least four of the conducting wire units 140 are disposed adjacently, a spacing between each adjacent two of the conducting wire units 140 is Dc, and the value of the aforementioned parameter is listed in the following TABLE 1C.

TABLE 1C

| Dc (mm) | 0.03 |
|---|---|

Figure 1J:
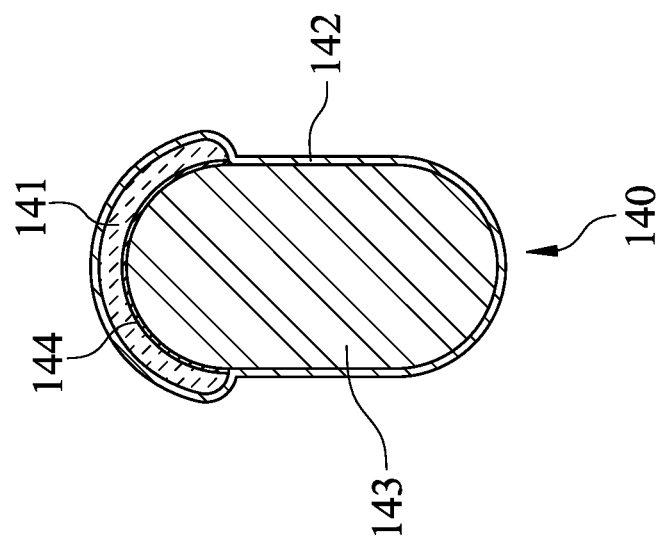
FIG. 1J is a cross-sectional view of the conducting wire unit in FIG. 1G of the 4th example of the 1st embodiment.
Figure 1J:
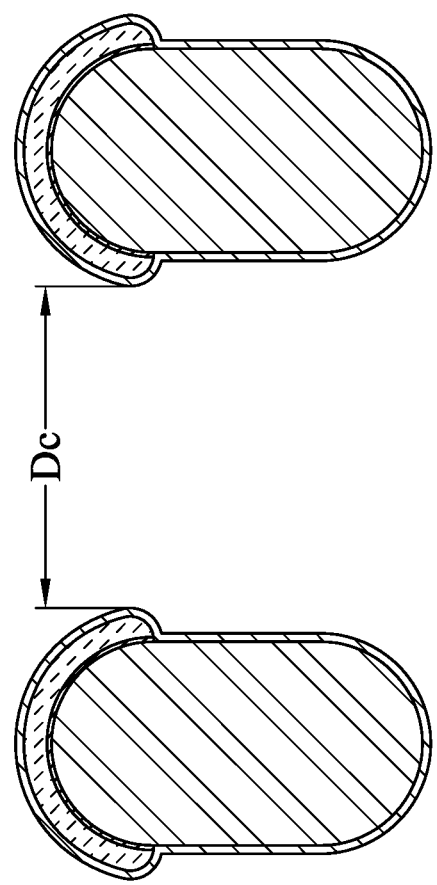

With reference to FIG. 1J, FIG. 1J is a cross-sectional view of the conducting wire unit 140 in FIG. 1G of the 4th example of the 1st embodiment. In FIG. 1J, the insulating layer 143 is a main body of each of the conducting wire units 140 and made of polyimide, the conductor lines 141 are made of 99% copper and 1% titanium, the connecting layers 144 are made of chromium oxide, and the air insulation layers 142 are made of parylene, but the present disclosure is not limited thereto.

In the 4th example of the 1st embodiment, at least four of the conducting wire units 140 are disposed adjacently, a spacing between each adjacent two of the conducting wire units 140 is Dc, and the value of the aforementioned parameter is listed in the following TABLE 1D.

TABLE 1D

| Dc (mm) | 0.19 |
|---|---|

2nd Embodiment

Figure 2A:
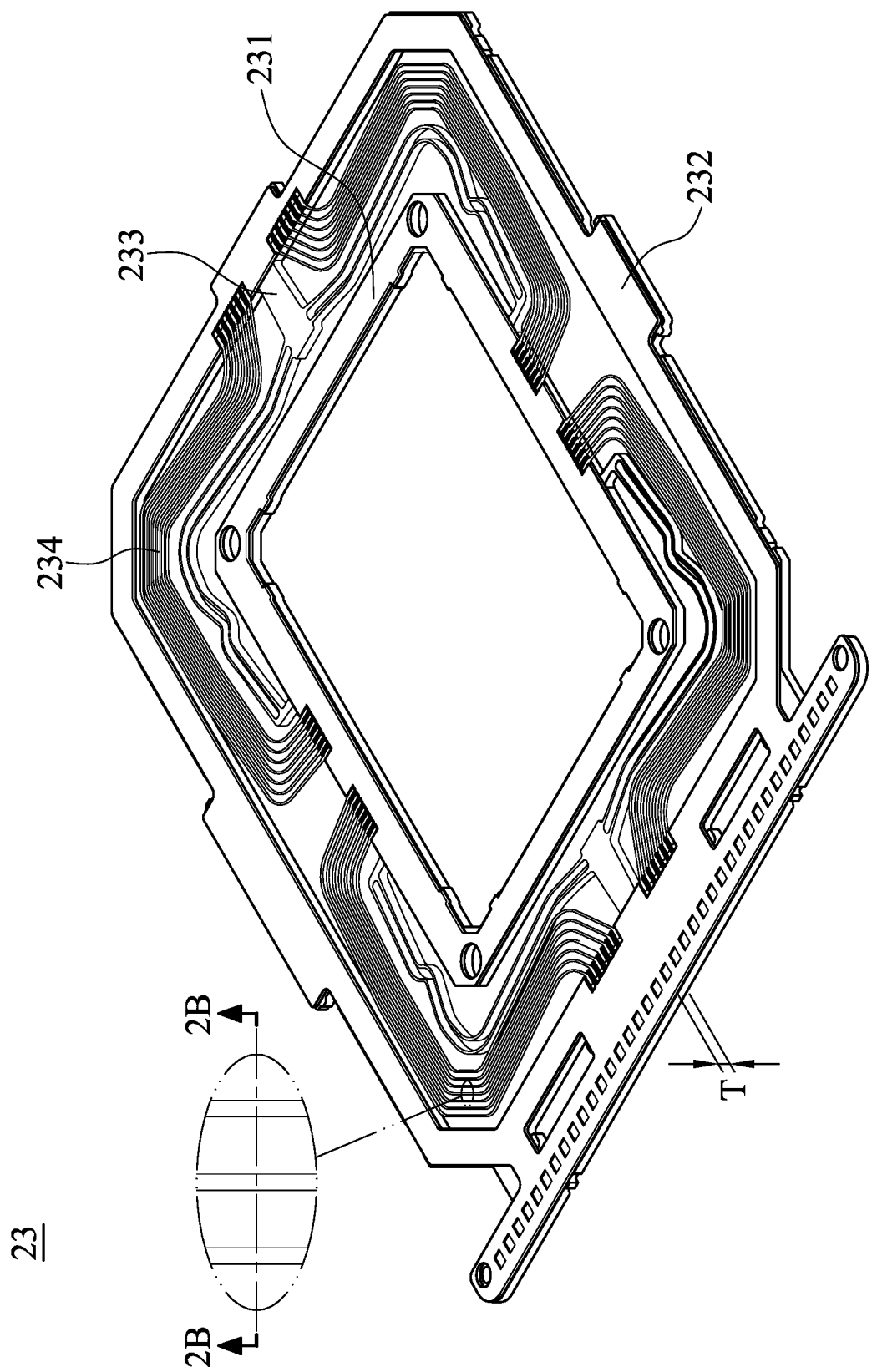
FIG. 2A is a three-dimensional view of a shiftable circuit element according to the 1st example of the 2nd embodiment of the present disclosure.
Figure 2B:
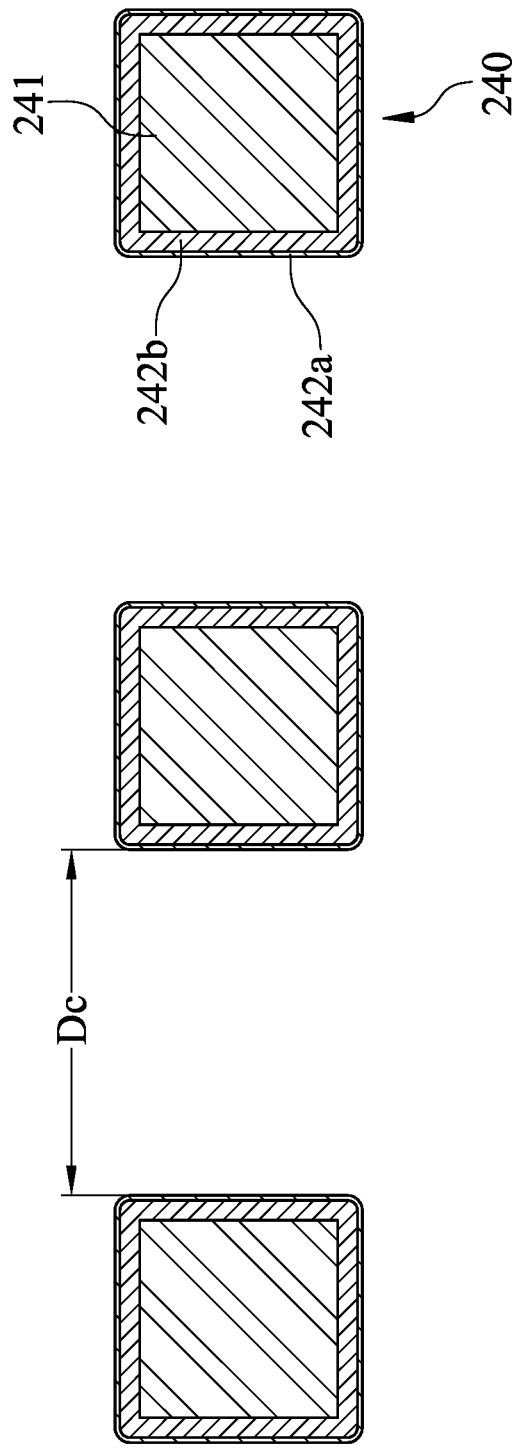
FIG. 2B is a cross-sectional view along line 2B-2B of a conducting wire unit in FIG. 2A of the 1st example of the 2nd embodiment.
Figure 2C:
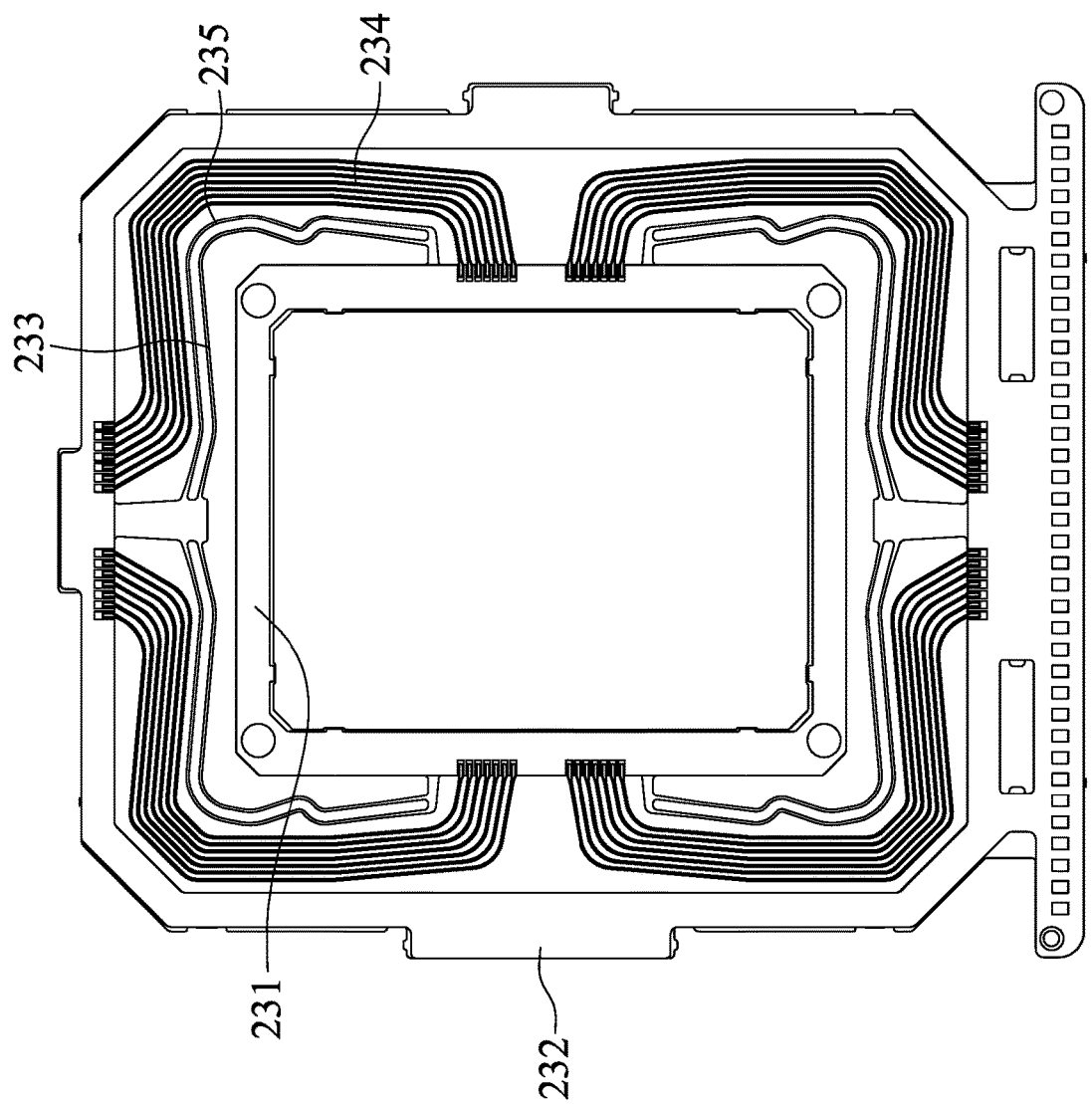
FIG. 2C is a planar view of the shiftable circuit element of the 1st example of the 2nd embodiment in FIG. 2A.
Figure 2D:
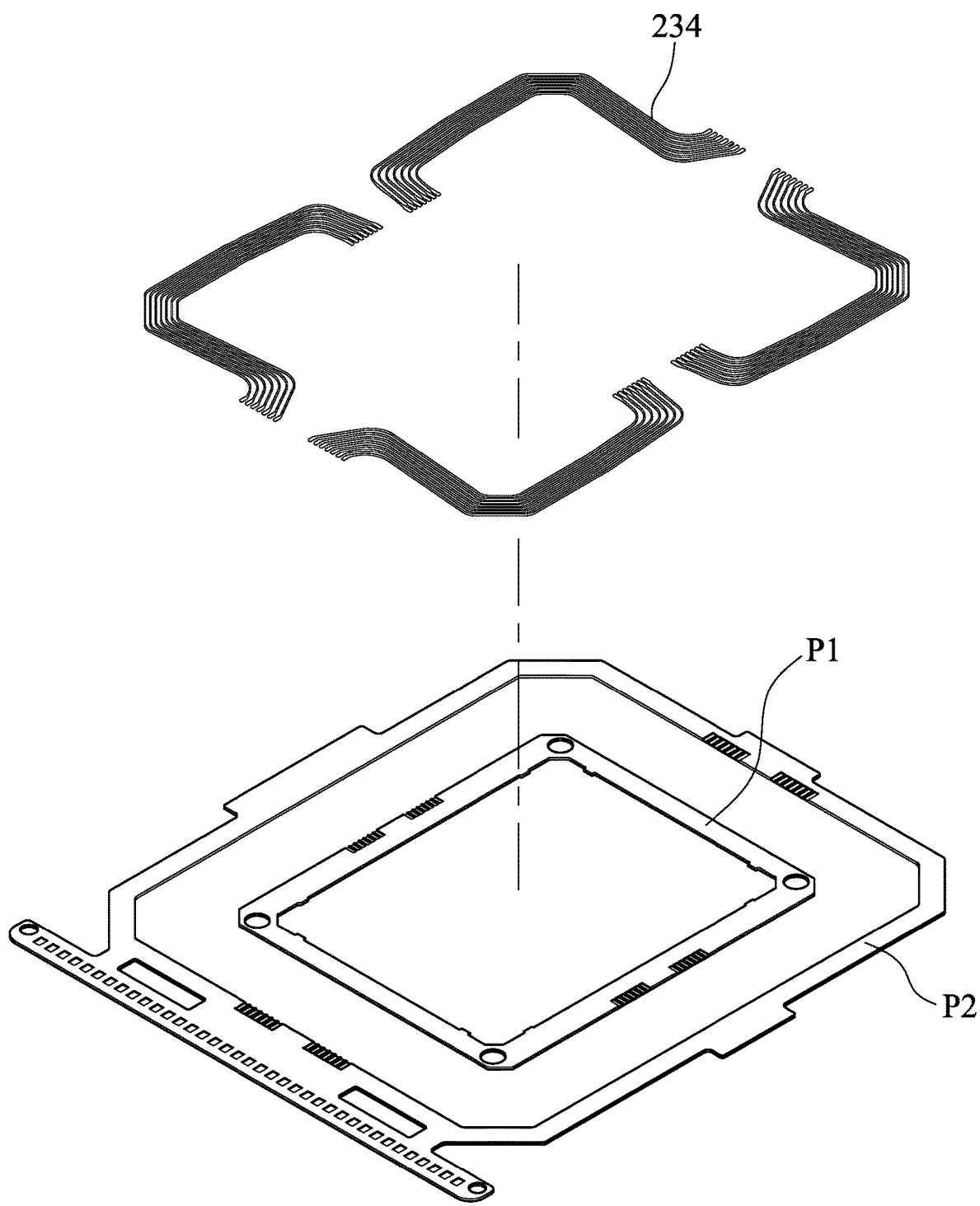
FIG. 2D is a partial view of the shiftable circuit element of the 1st example of the 2nd embodiment in FIG. 2A.
Figure 2E:
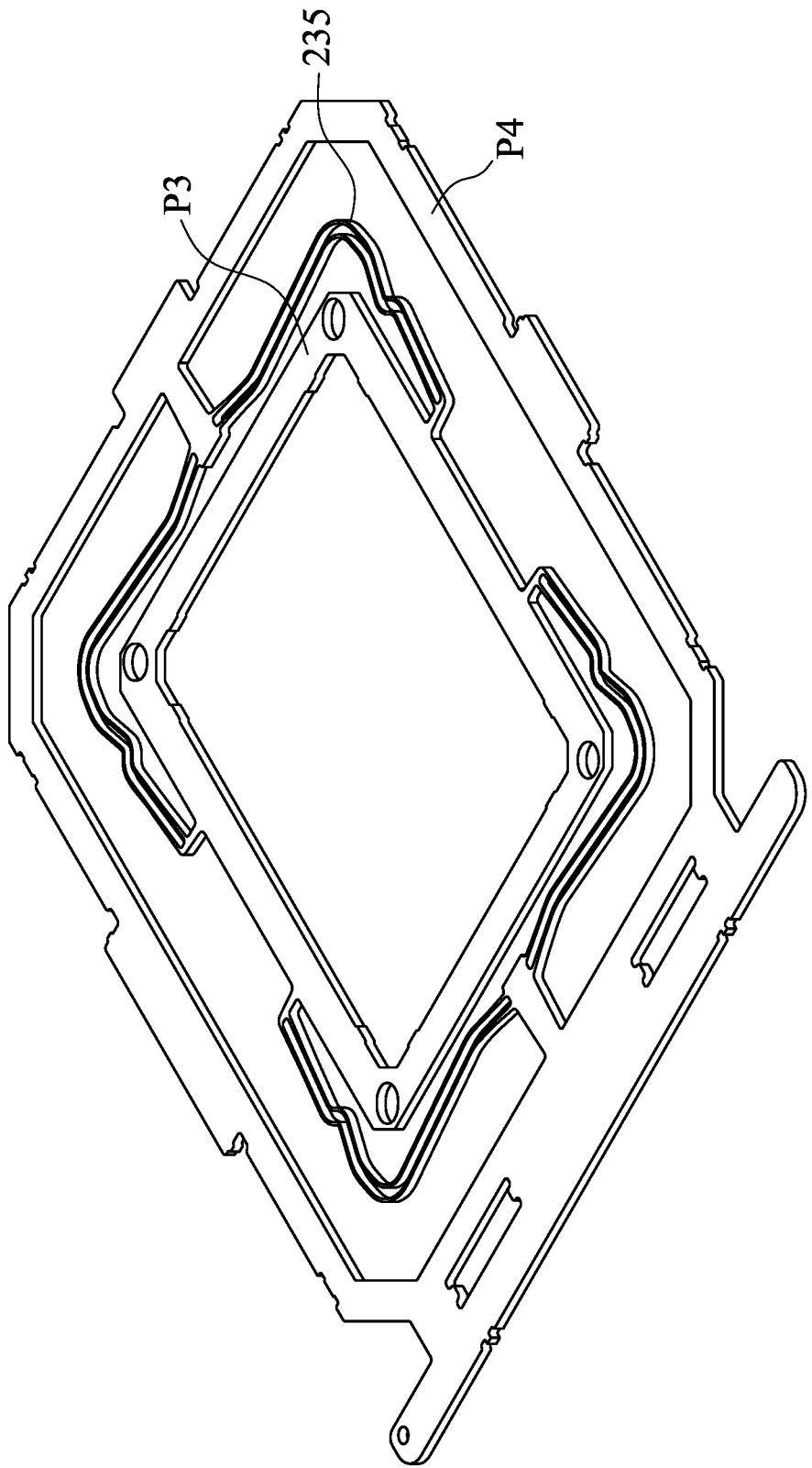
FIG. 2E is another partial view of the shiftable circuit element of the 1st example of the 2nd embodiment in FIG. 2A.

With reference to FIG. 2A to FIG. 2E, FIG. 2A is a three-dimensional view of a shiftable circuit element 23 according to the 1st example of the 2nd embodiment of the present disclosure, FIG. 2B is a cross-sectional view along line 2B-2B of a conducting wire unit 240 in FIG. 2A of the 1st example of the 2nd embodiment, FIG. 2C is a planar view of the shiftable circuit element 23 of the 1st example of the 2nd embodiment in FIG. 2A, FIG. 2D is a partial view of the shiftable circuit element 23 of the 1st example of the 2nd embodiment in FIG. 2A, and FIG. 2E is another partial view of the shiftable circuit element 23 of the 1st example of the 2nd embodiment in FIG. 2A. In FIG. 2A to FIG. 2E, the shiftable circuit element 23 includes a movable portion 231, a fixed portion 232, an elastic connecting portion 233 and a conducting wire portion 234. The shiftable circuit element 23 of the 2nd embodiment may be disposed in the shiftable image sensor module of the camera module 10 of the 1st embodiment, but is not limited thereto. Furthermore, the fixed portion 232 is disposed around the movable portion 231. The elastic connecting portion 233 is connected to the movable portion 231 and the fixed portion 232, so that the movable portion 231 is able to move relatively to the fixed portion 232, and is configured to provide a restoring force for the movable portion 231 to return to an initial position. There is no physical contact between the elastic connecting portion 233 and the conducting wire portion 234. The separate design between the elastic connecting portion 233 and the conducting wire portion 234 is favorable for preventing from mechanism interference and avoiding errors during signal transmission. The conducting wire portion 234 includes a plurality of conducting wire units 240.

In FIG. 2C and FIG. 2E, the elastic connecting portion 233 may include at least one bent section 235, and the bent section 235 is disposed between two ends of the elastic connecting portion 233. Therefore, it is advantageous in balancing the movement amount on a plane and improving the reliability of the elastic element.

In FIG. 2D and FIG. 2E, the movable portion 231 has an electrical signal transmission section P1 and an elastic support section P3, and the fixed portion 232 has an electrical signal transmission section P2 and an elastic support section P4. The conducting wire portion 234 may be connected to the movable portion 231 and the fixed portion 232 by welding, so that the electrical signals can be transmitted between the movable portion 231 and the fixed portion 232. The elastic support sections P3, P4 are configured for connecting to the elastic connecting portion 233 to provide supports for the fixed portion 232 and the movable portion 231, and further provide the movable portion 231 in one degree of freedom on the plane and prevent the conducting wire portion 234 from damage.

In FIG. 2B, each of the conducting wire units 240 includes at least one conductor line 241, the conductor line 241 includes air insulation layers 242a, 242b, the air insulation layer 242b is located on an outer surface of the conductor line 241, and the air insulation layer 242a is located on an outer surface of the air insulation layer 242b. Specifically, the conductor lines 241 covered by the air insulation layers 242a, 242b on the outer surfaces thereof act as the conducting wire units 240 of the shiftable circuit element 23, so that it is favorable for enhancing the durability of the conducting wire units 240, keeping the low interference of the conducting wire portion 234 while driving the movable portion 231, and further providing the electrical signal transmission with a higher signal-to-noise ratio.

An outer periphery of each of the conducting wire units 240 may be completely covered by the corresponding air insulation layers 242a, 242b, so that the conducting wire units 240 can be ensured to be completely isolated from the outside air. Each of the air insulation layers 242a, 242b may be a visible light absorbing layer, so that the occurring probability of the stray light can be reduced. The appearance of each of the air insulation layers 242a, 242b may be a black surface for absorbing the visible light, so as to avoid the reflected light. Furthermore, the air insulation layers 242a, 242b can be used for preventing the conductor lines 241 from oxidation, protecting the conductor lines 241 from breakage, and further preventing from short circuit.

In the 1st example of the 2nd embodiment, the conductor line 241 is a main body of each of the conducting wire units 240, and the main body of each of the conducting wire units 240 may be entirely made of the alloy material, the conductor lines 241 are made of 99% copper and 1% titanium, the air insulation layers 242a are parylene films, and the air insulation layers 242b are chromium dioxide films, but the present disclosure is not limited thereto.

In FIG. 2A and FIG. 2B, a total thickness of the shiftable circuit element 23 is T, at least four of the conducting wire units 240 are disposed adjacently, a spacing between each adjacent two of the conducting wire units 240 is Dc, and the values of the aforementioned parameters are listed in the following TABLE 2A.

TABLE 2A

| T (mm) | 0.45 | Dc (mm) | 0.09 |
|---|---|---|---|

Figure 2F:
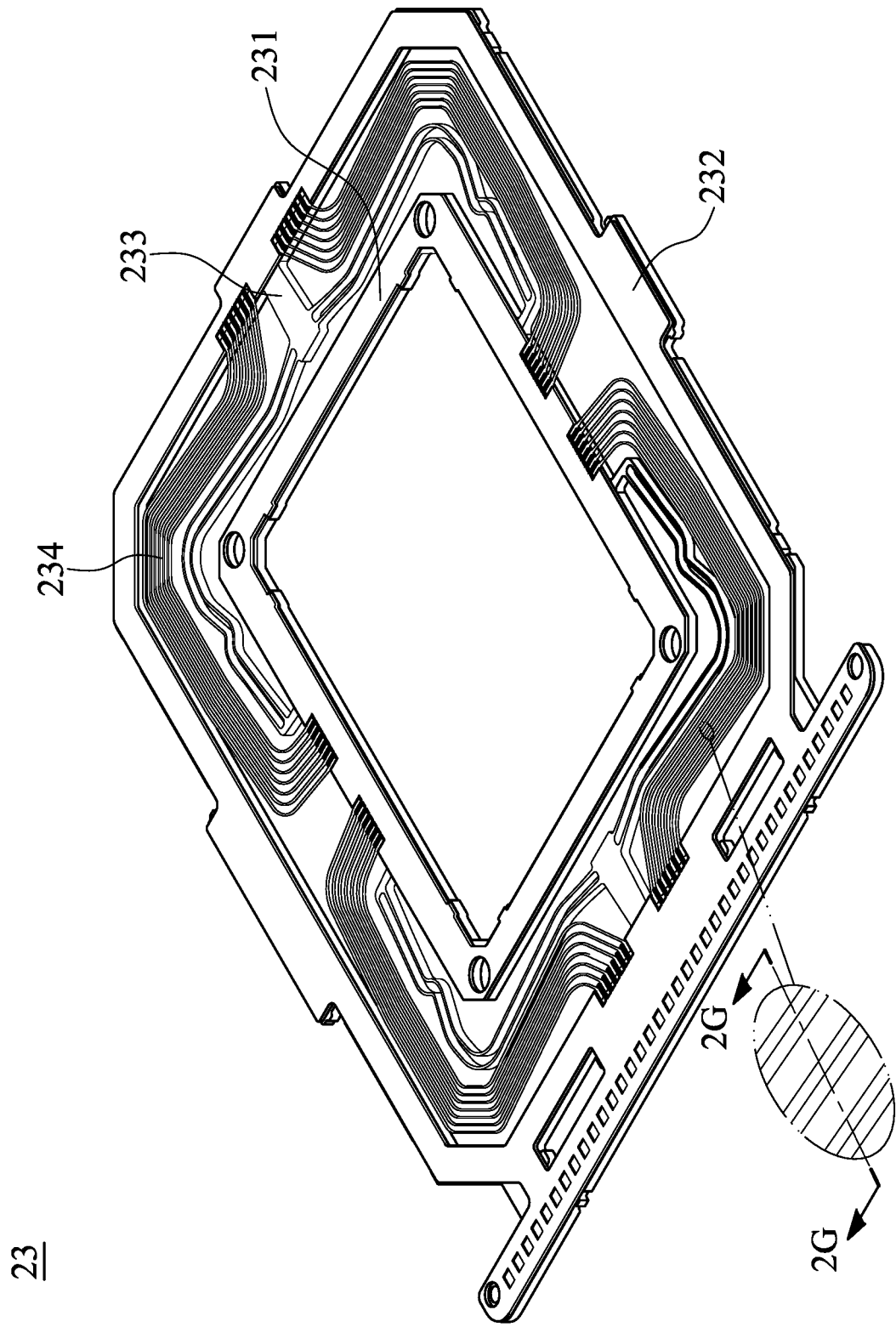
FIG. 2F is a three-dimensional view of the shiftable circuit element of the 2nd example of the 2nd embodiment in FIG. 2A.
Figure 2G:
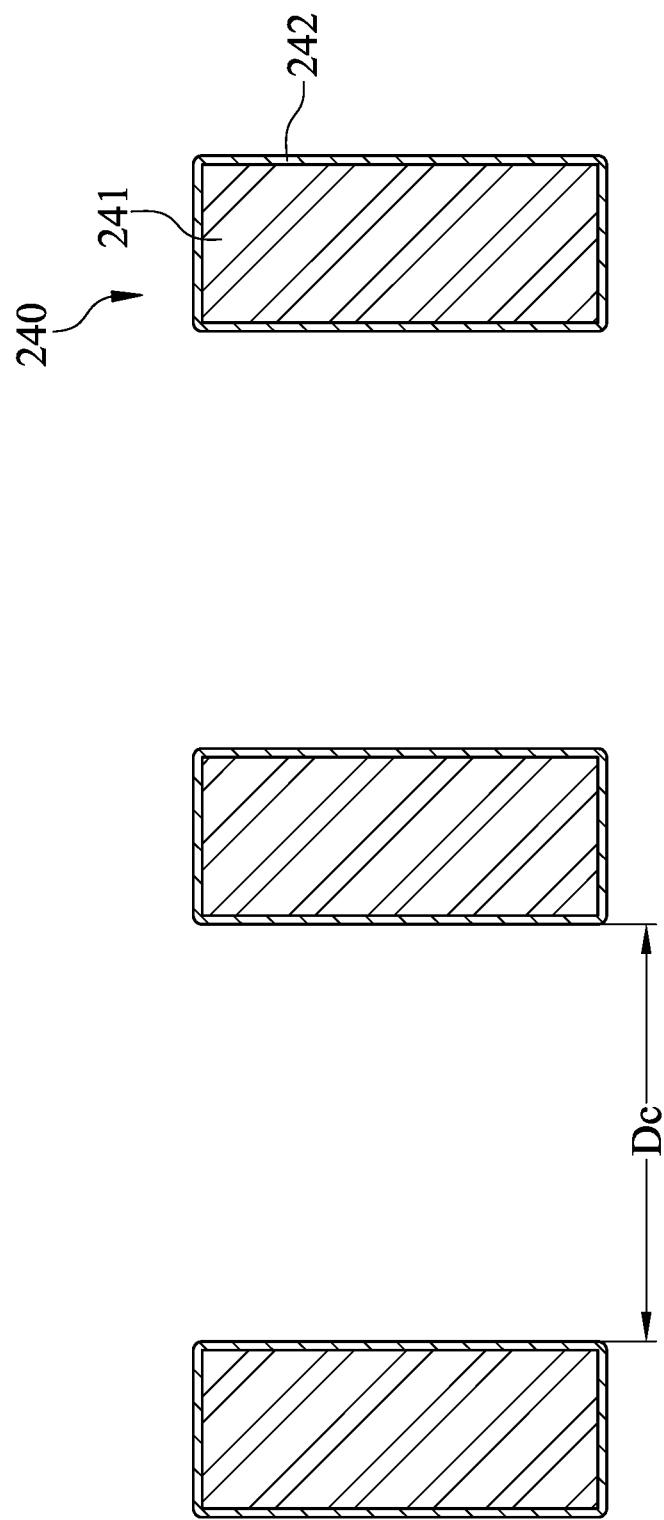
FIG. 2G is a cross-sectional view along line 2G-2G of the conducting wire unit in FIG. 2F of the 2nd example of the 2nd embodiment.

With reference to FIG. 2F and FIG. 2G, FIG. 2F is a three-dimensional view of the shiftable circuit element 23 of the 2nd example of the 2nd embodiment in FIG. 2A, and FIG. 2G is a cross-sectional view along line 2G-2G of the conducting wire unit 240 in FIG. 2F of the 2nd example of the 2nd embodiment. In FIG. 2F and FIG. 2G, each of the conductor lines 241 includes an air insulation layer 242 located on an outer surface of each of the conductor lines 241. In the 2nd example of the 2nd embodiment, the conductor line 241 is a main body of each of the conducting wire units 240, and the main body of each of the conducting wire units 240 may be entirely made of the alloy material, the conductor lines 241 are made of 98% copper and 2% aluminum, and the air insulation layers 242 are made of aluminum oxide, but the present disclosure is not limited thereto.

In FIG. 2G, at least four of the conducting wire units 240 are disposed adjacently, a spacing between each adjacent two of the conducting wire units 240 is Dc, and the value of the aforementioned parameter is listed in the following TABLE 2B.

TABLE 2B

| Dc (mm) | 0.14 |
|---|---|

Figure 2H:
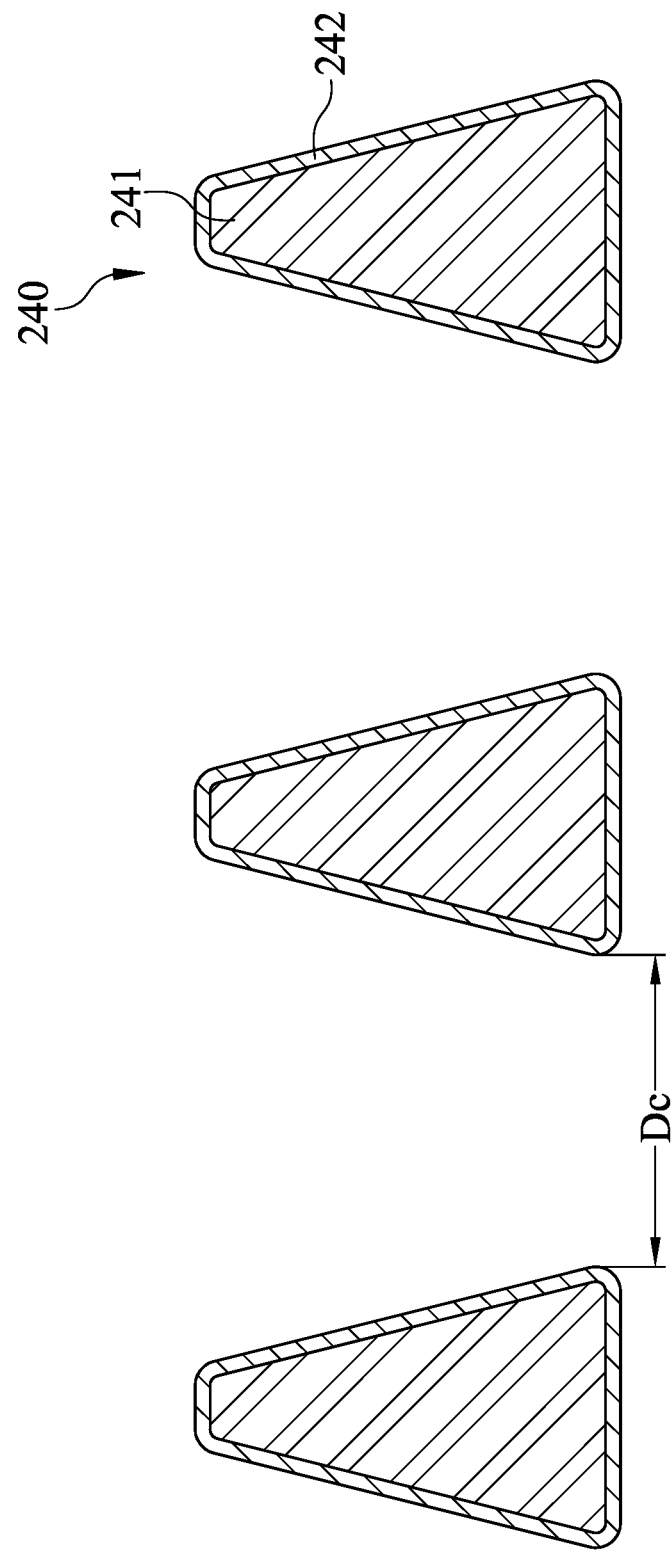
FIG. 2H is a cross-sectional view of the conducting wire unit in FIG. 2F of the 3rd example of the 2nd embodiment.

With reference to FIG. 2H, FIG. 2H is a cross-sectional view of the conducting wire unit 240 in FIG. 2F of the 3rd example of the 2nd embodiment. In FIG. 2H, the conductor line 241 is a main body of each of the conducting wire units 240, and the main body of each of the conducting wire units 240 may be made of the metal material or the alloy material. The conducting wire units 240 are specifically made of copper, and the air insulation layers 242 are made of parylene, but the present disclosure is not limited thereto.

In the 3rd example of the 2nd embodiment, at least four of the conducting wire units 240 are disposed adjacently, a spacing between each adjacent two of the conducting wire units 240 is Dc, and the value of the aforementioned parameter is listed in the following TABLE 2C.

TABLE 2C

| Dc (mm) | 0.07 |
|---|---|

3rd Embodiment

Figure 3A:
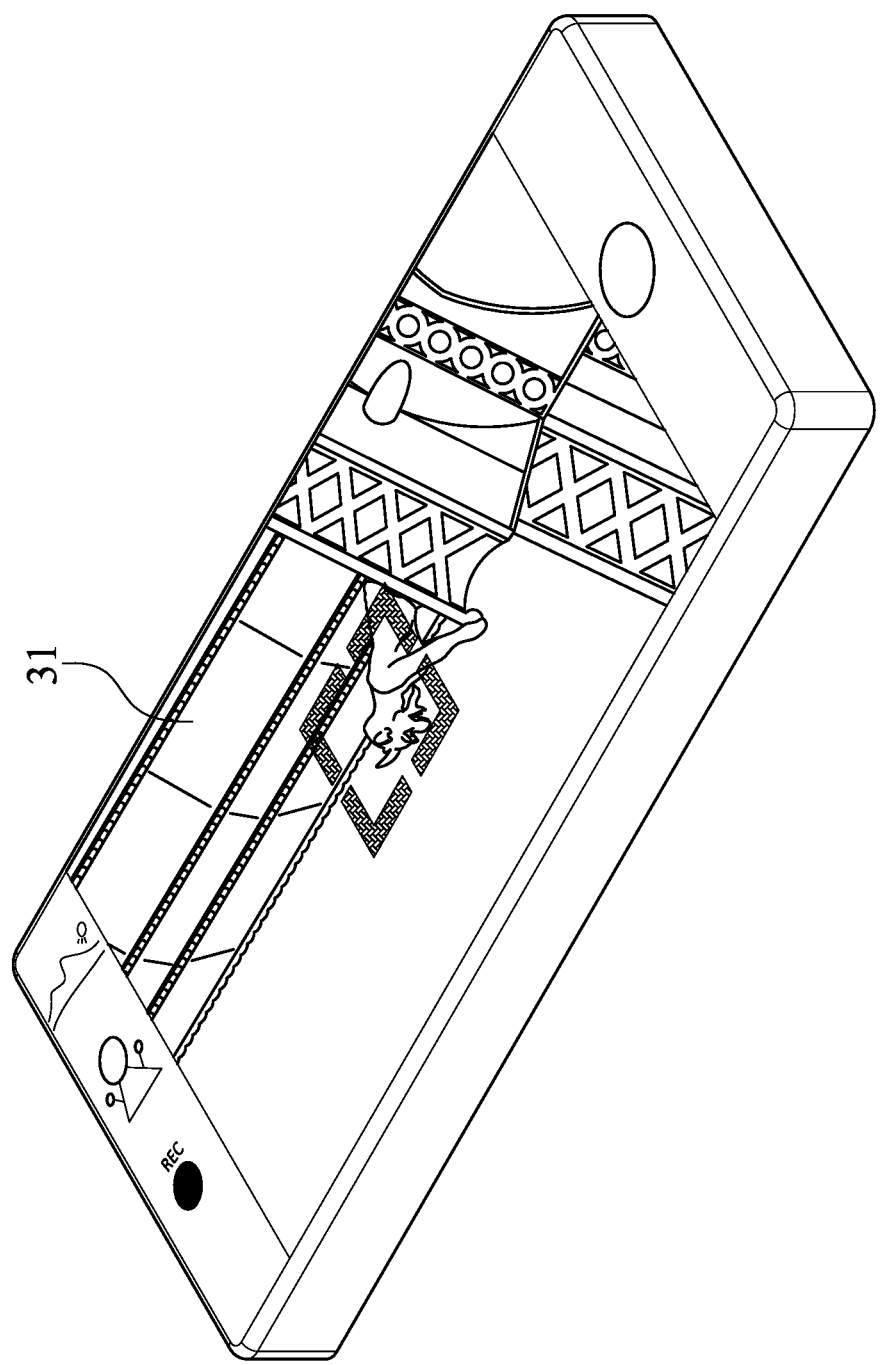
FIG. 3A is a schematic view of an electronic device according to the 3rd embodiment of the present disclosure.
Figure 3B:
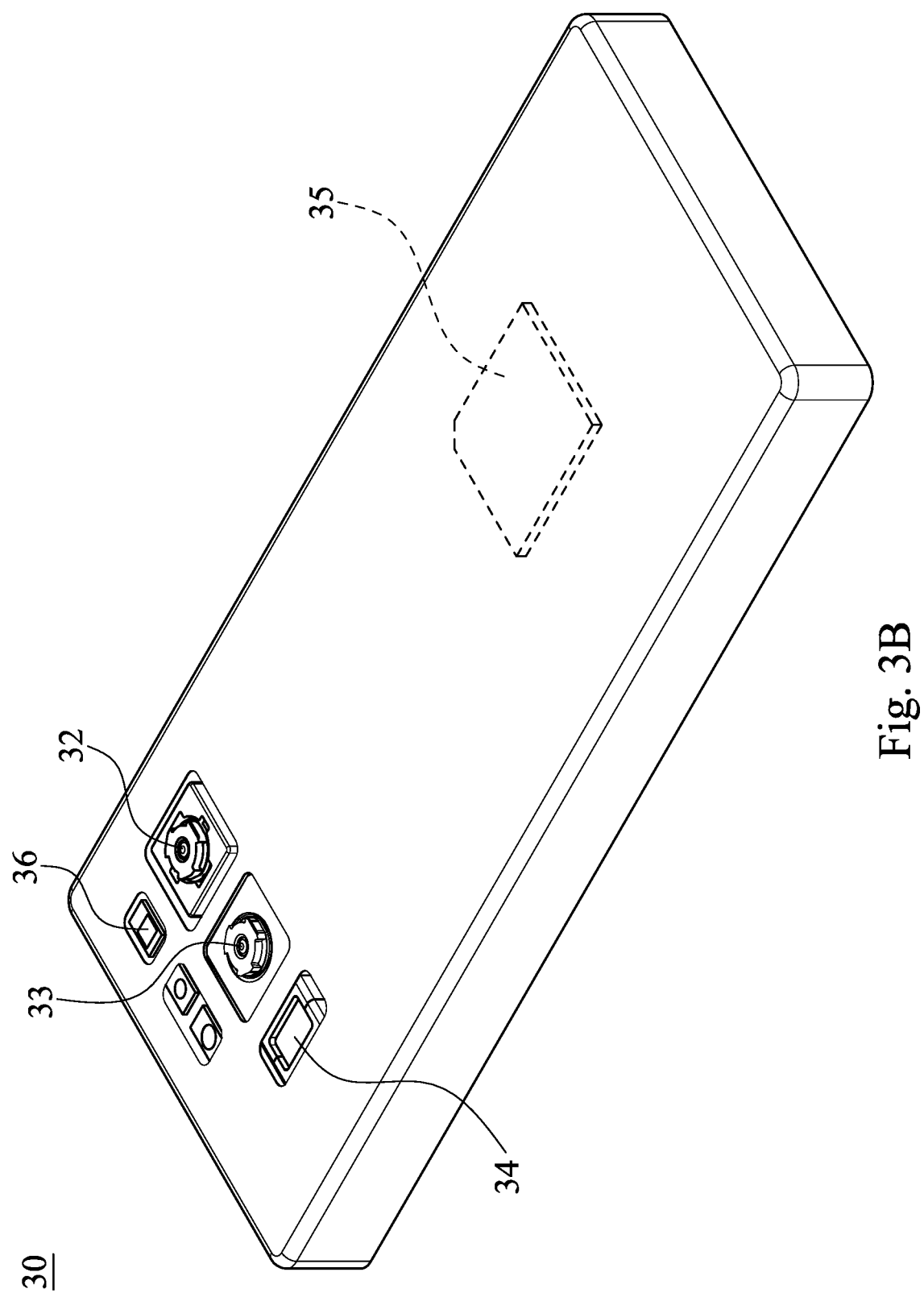
FIG. 3B is another schematic view of the electronic device according to the 3rd embodiment in FIG. 3A.

FIG. 3A is a schematic view of an electronic device 30 according to the 3rd embodiment of the present disclosure. FIG. 3B is another schematic view of the electronic device 30 according to the 3rd embodiment in FIG. 3A. In FIG. 3A and FIG. 3B, the electronic device 30 is a smart phone, and includes a camera module and a user interface 31. Moreover, the camera module can be an ultra-wide angle camera module 32, a high resolution camera module 33 and a telephoto camera module 34, and the user interface 31 is a touch screen, but the present disclosure is not limited thereto. In particular, the camera module can be one of the camera modules according to the aforementioned 1st embodiment and the 2nd embodiment, but the present disclosure is not limited thereto.

Users enter a shooting mode via the user interface 31, wherein the user interface 31 is configured to display the scene, and the shooting angle can be manually adjusted to switch the ultra-wide angle camera module 32, the high resolution camera module 33 and the telephoto camera module 34. At this moment, the imaging light is gathered on the image sensor (not shown) via the camera module, and an electronic signal about an image is output to an image signal processor (ISP) 35.

In FIG. 3B, to meet a specification of the electronic device 30, the electronic device 30 can further include an optical anti-shake mechanism (not shown). Furthermore, the electronic device 30 can further include at least one focusing assisting module (its reference numeral is omitted) and at least one sensing element (not shown). The focusing assisting module can be a flash module 36 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the camera module of the electronic device 30 equipped with an auto-focusing mechanism and the optical anti-shake mechanism can be enhanced to achieve the superior image quality. Furthermore, the electronic device 30 according to the present disclosure can have a capturing function with multiple modes, such as taking optimized selfies, high dynamic range (HDR) under a low light condition, 4K resolution recording and so on. Furthermore, the users can visually see a captured image of the camera through the user interface 31 and manually operate the view finding range on the user interface 31 to achieve the autofocus function of what you see is what you get.

Moreover, the camera module, the optical anti-shake mechanism, the sensing element and the focusing assisting module can be disposed on a flexible printed circuit board (FPC) (not shown) and electrically connected to the associated components, such as the image signal processor 35, via a connector (not shown) to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. According to the 3rd embodiment, the electronic device 30 can include a plurality of sensing elements and a plurality of focusing assisting modules. The sensing elements and the focusing assisting modules are disposed on the flexible printed circuit board and at least one other flexible printed circuit board (not shown) and electrically connected to the associated components, such as the image signal processor 35, via corresponding connectors to perform the capturing process. In other embodiments (not shown herein), the sensing elements and the focusing assisting modules can also be disposed on the main board of the electronic device or carrier boards of other types according to requirements of the mechanical design and the circuit layout.

Furthermore, the electronic device 30 can further include, but not be limited to, a display, a control unit, a storage unit, a random access memory (RAM), a read-only memory (ROM), or the combination thereof.

Figure 3C:
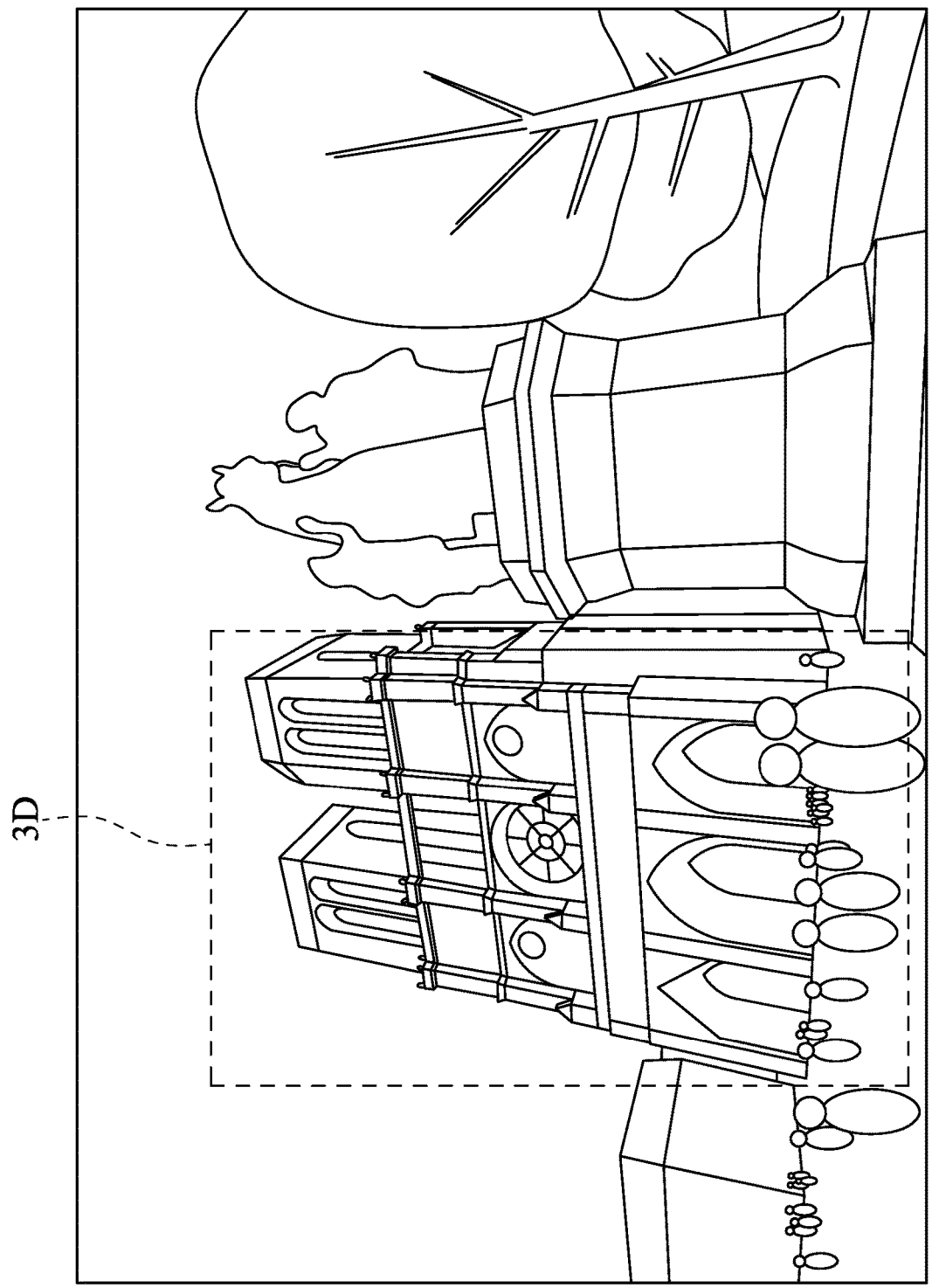
FIG. 3C is a schematic view of an image captured via the electronic device according to the 3rd embodiment in FIG. 3A.

FIG. 3C is a schematic view of an image captured via the electronic device 30 according to the 3rd embodiment in FIG. 3A. In FIG. 3C, the larger range of the image can be captured via the ultra-wide angle camera module 32, and the ultra-wide angle camera module 32 has the function of accommodating wider range of the scene.

Figure 3D:
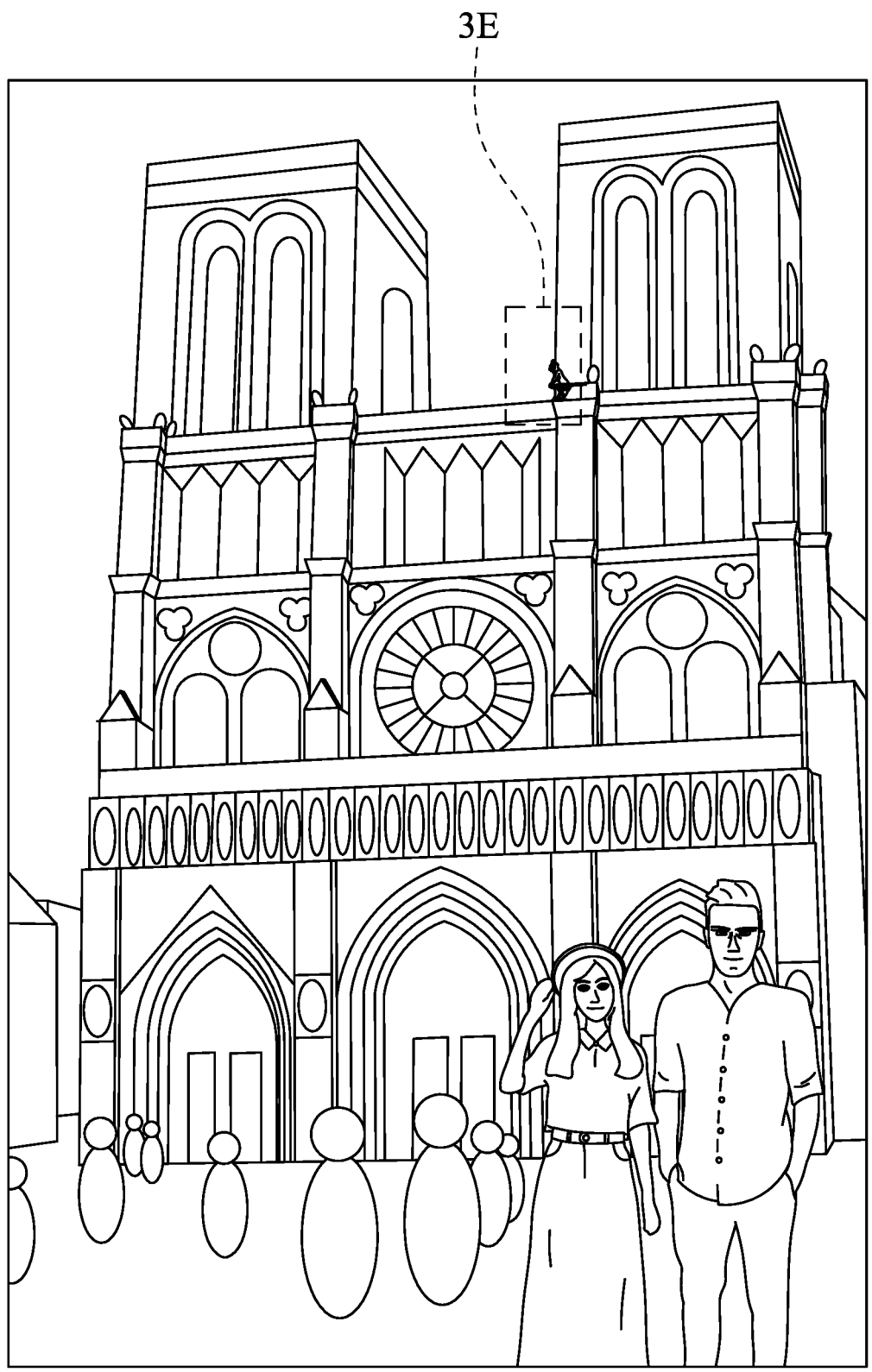
FIG. 3D is another schematic view of an image captured via the electronic device according to the 3rd embodiment in FIG. 3A.

FIG. 3D is another schematic view of an image captured via the electronic device 30 according to the 3rd embodiment in FIG. 3A. In FIG. 3D, the image of the certain range with the high resolution can be captured via the high resolution camera module 33, and the high resolution camera module 33 has the function of the high resolution and the low deformation.

Figure 3E:
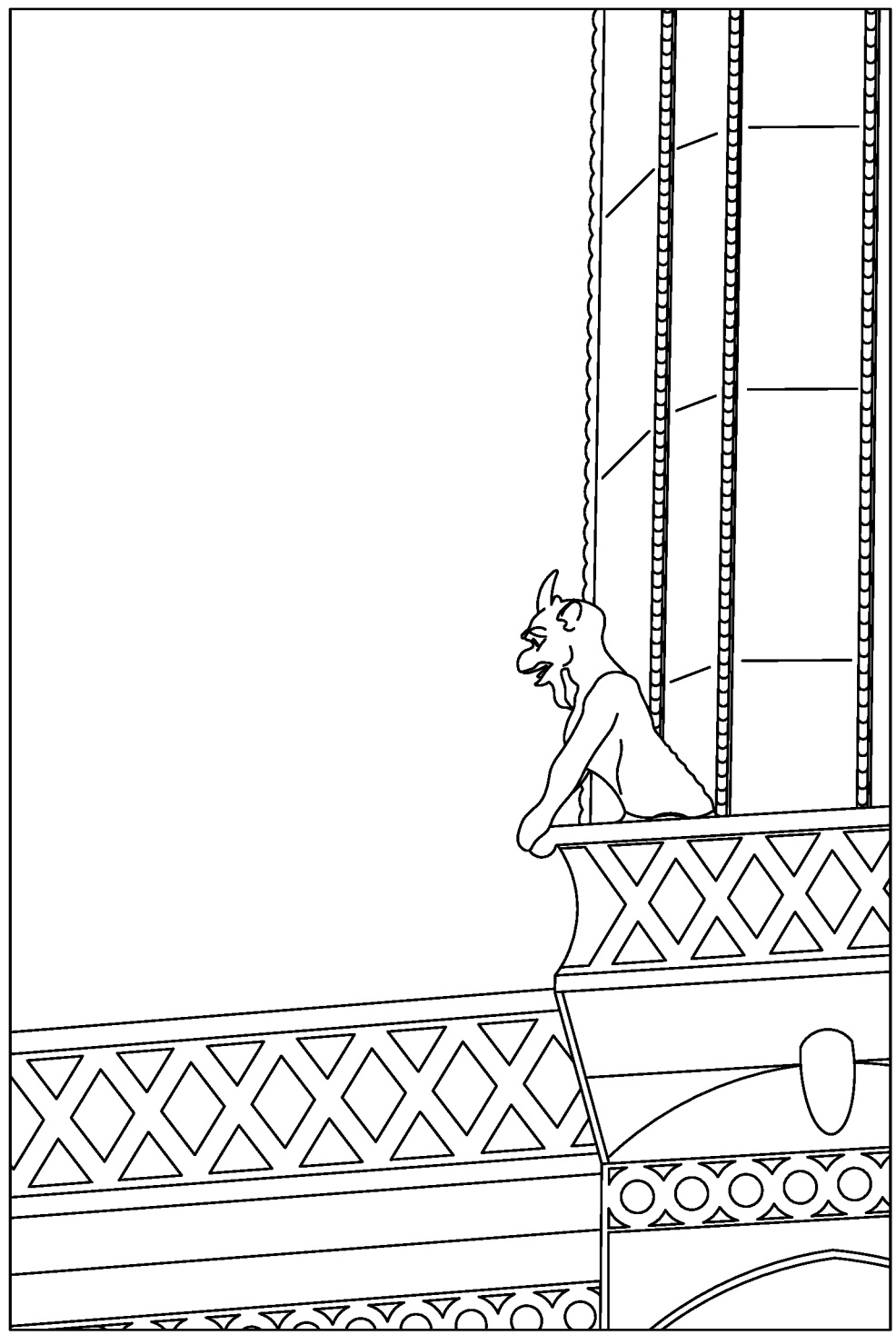
FIG. 3E is still another schematic view of an image captured via the electronic device according to the 3rd embodiment in FIG. 3A.

FIG. 3E is still another schematic view of an image captured via the electronic device 30 according to the 3rd embodiment in FIG. 3A. In FIG. 3E, the telephoto camera module 34 has the enlarging function of the high magnification, and the distant image can be captured and enlarged with high magnification via the telephoto camera module 34.

In FIG. 3C to FIG. 3E, the zooming function can be obtained via the electronic device 30, when the scene is captured via the camera module with different focal lengths cooperated with the function of image processing.

4th Embodiment

Figure 4:
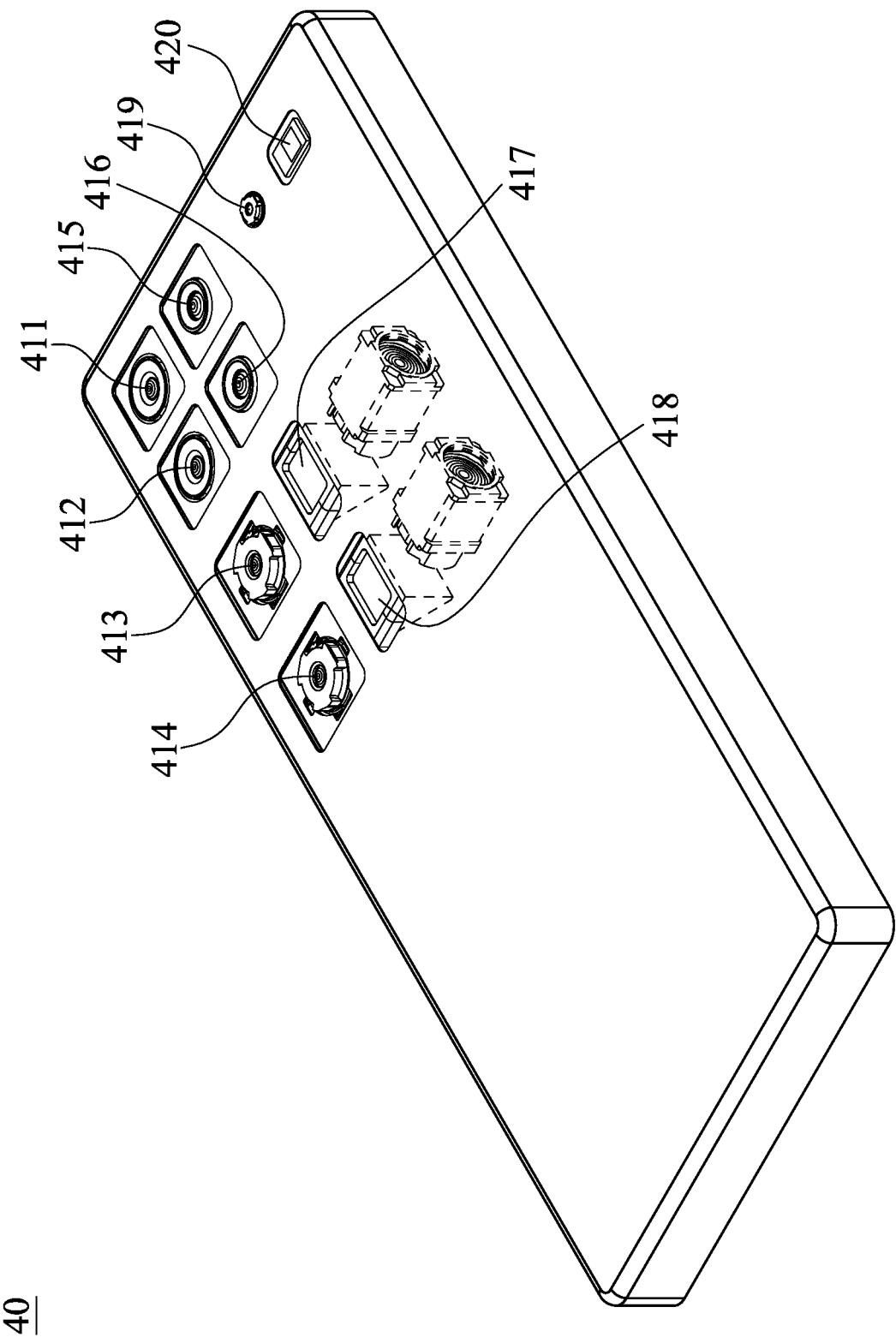
FIG. 4 is a schematic view of an electronic device according to the 4th embodiment of the present disclosure.

FIG. 4 is a schematic view of an electronic device 40 according to the 4th embodiment of the present disclosure.

In FIG. 4, the electronic device 40 is a smart phone, and includes a camera module. Moreover, the camera module can be one of ultra-wide angle camera modules 411, 412, wide angle camera modules 413, 414, telephoto camera modules 415, 416, 417, 418 and a Time-Of-Flight (TOF) module 419. The TOF module 419 can be another type of the camera module, and the disposition is not limited thereto. In particular, the camera module can be one of the camera modules according to the aforementioned 1st embodiment and the 2nd embodiment, but the present disclosure is not limited thereto.

Further, the telephoto camera modules 417, 418 are configured to fold the light, but the present disclosure is not limited thereto.

To meet a specification of the electronic device 40, the electronic device 40 can further include an optical anti-shake mechanism (not shown). Furthermore, the electronic device 40 can further include at least one focusing assisting module (not shown) and at least one sensing element (not shown). The focusing assisting module can be a flash module 420 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the camera module of the electronic device 40 equipped with an auto-focusing mechanism and the optical anti-shake mechanism can be enhanced to achieve the superior image quality. Furthermore, the electronic device 40 according to the present disclosure can have a capturing function with multiple modes, such as taking optimized selfies, High Dynamic Range (HDR) under a low light condition, 4K Resolution recording and so on.

Further, all of other structures and dispositions according to the 4th embodiment are the same as the structures and the dispositions according to the 3th embodiment, and will not be described again herein.

5th Embodiment

Figure 5A:
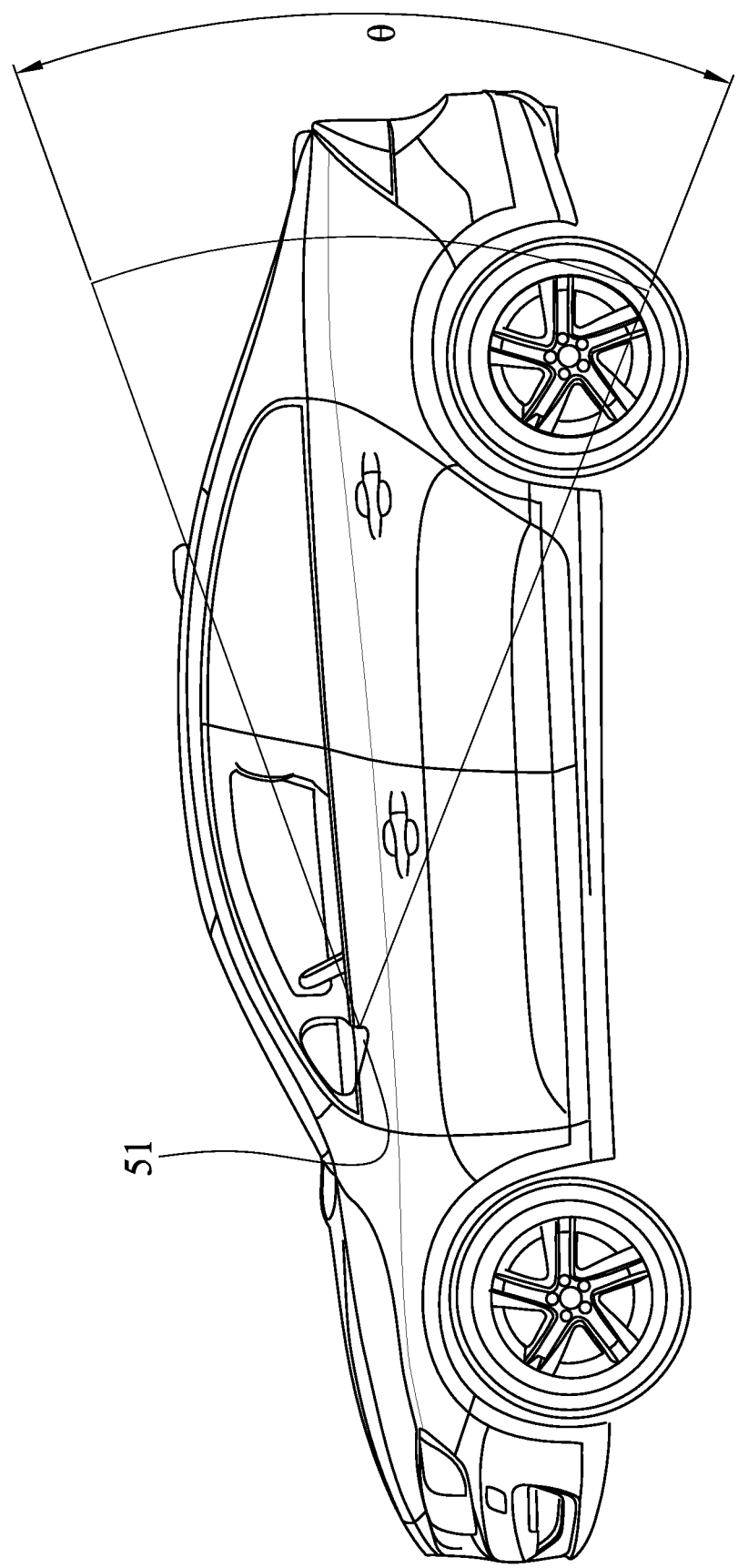
FIG. 5A is a schematic view of a vehicle instrument according to the 5th embodiment of the present disclosure.
Figure 5B:
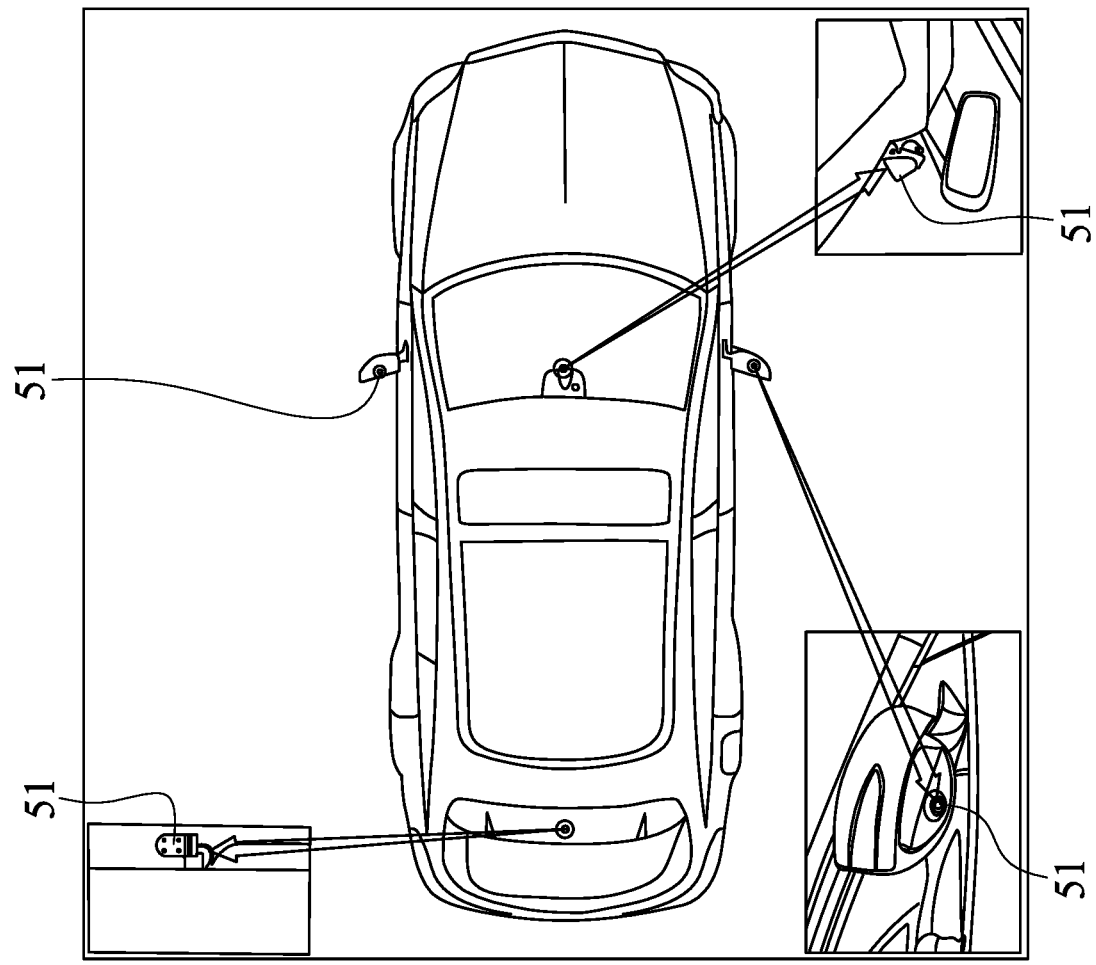
FIG. 5B is another schematic view of the vehicle instrument according to the 5th embodiment in FIG. 5A.

FIG. 5A is a schematic view of a vehicle instrument 50 according to the 5th embodiment of the present disclosure. FIG. 5B is another schematic view of the vehicle instrument 50 according to the 5th embodiment in FIG. 5A. FIG. 5C is still another schematic view of the vehicle instrument 50 according to the 5th embodiment in FIG. 5A. In FIG. 5A to FIG. 5C, the vehicle instrument 50 includes a plurality of camera modules 51. According to the 5th embodiment, a number of the camera modules 51 is six, and one of the camera modules can be one of the camera modules according to the aforementioned 1st embodiment and the 2nd embodiment, but the present disclosure is not limited thereto.

In FIG. 5A and FIG. 5B, the camera modules 51 are automotive camera modules, two of the camera modules 51 are located under rearview mirrors on a left side and a right side, respectively, and the aforementioned camera modules 51 are configured to capture the image information of a visual angle θ. In particular, the visual angle θ can satisfy the following condition: 40 degrees<θ<90 degrees. Therefore, the image information in the regions of two lanes on the left side and the right side can be captured.

In FIG. 5B, another two of the camera modules 51 can be disposed in the inner space of the vehicle instrument 50. In particular, the aforementioned two camera modules 51 are disposed on a location close to the rearview mirror inside the vehicle instrument 50 and a location close to the rear car window, respectively. Moreover, the camera modules 51 can be further disposed on the rearview mirrors on the left side and the right side except the mirror surface, respectively, but the present disclosure is not limited thereto.

In FIG. 5C, another two of the camera modules 51 can be disposed on a front end of the vehicle instrument 50 and a rear end of the vehicle instrument 50, respectively. By disposing the camera modules 51 on the front end and the rear end of the vehicle instrument 50 and under the rearview mirror on the left side of the vehicle instrument 50 and the right side of the vehicle instrument 50, it is favorable for the drivers obtaining the external space information in addition to the driving seat, such as the external space informations 11, 12, 13, 14, but the present disclosure is not limited thereto. Therefore, more visual angles can be provided to reduce the blind spot, so that the driving safety can be improved. Further, the traffic information outside of the vehicle instrument 50 can be recognized by disposing the camera modules 51 on the periphery of the vehicle instrument 50, so that the function of the automatic driving assistance can be achieved.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A shiftable image sensor module, comprising:
an image sensor; and
a shiftable circuit element comprising:
  a movable portion, wherein the image sensor is disposed on the movable portion;
  a fixed portion disposed around the movable portion;
  an elastic connecting portion connected to the movable portion and the fixed portion, so that the movable portion is able to move relatively to the fixed portion, and is configured to provide a restoring force for the movable portion to return to an initial position; and
  a conducting wire portion comprising a plurality of conducting wire units, wherein each of the conducting wire units is electrically connected from the fixed portion to the image sensor, and there is no physical contact between the elastic connecting portion and the conducting wire portion;
wherein each of the conducting wire units comprises at least one conductor line, and the conductor line comprises an air insulation layer located on an outer surface of the conductor line.

2. The shiftable image sensor module of claim 1, wherein each of the air insulation layers comprises at least one of a metal oxide material and a semiconductor oxide material.

3. The shiftable image sensor module of claim 1, wherein each of the air insulation layers comprises a polymer material.

4. The shiftable image sensor module of claim 1, wherein the at least one conductor line of each of the conducting wire units is made of a conductor material, and the conductor material is a metal material.

5. The shiftable image sensor module of claim 1, wherein the at least one conductor line of each of the conducting wire units is made of a conductor material, and the conductor material is an alloy material.

6. The shiftable image sensor module of claim 1, wherein each of the conducting wire units further comprises an insulating layer, and the at least one conductor line of each of the conducting wire units is disposed on the insulating layer.

7. The shiftable image sensor module of claim 6, wherein the at least one conductor line of each of the conducting wire units forms a conductor line layer on the insulating layer.

8. The shiftable image sensor module of claim 7, wherein a connection layer is disposed between the insulating layer and the conductor line layer of each of the conducting wire units, and the connection layer is configured for connecting the insulating layer and the conductor line layer.

9. The shiftable image sensor module of claim 1, wherein a total thickness of the shiftable circuit element is T, and the following condition is satisfied:

$$0.10 \text{ mm} < T < 1.35 \text{ mm}.$$

10. The shiftable image sensor module of claim 1, wherein the movable portion is able to move relatively to the fixed portion on a plane parallel to the image sensor.

11. The shiftable image sensor module of claim 1, further comprising:
a movable base disposed on the movable portion and being a plastic anti-collision buffer mechanism.

12. The shiftable image sensor module of claim 1, wherein there is no physical contact between the conducting wire units of the conducting wire portion.

13. The shiftable image sensor module of claim 1, wherein the elastic connecting portion comprises at least one bent section, and the at least one bent section is disposed between two ends of the elastic connecting portion.

14. The shiftable image sensor module of claim 1, wherein an outer periphery of each of the conducting wire units is completely covered by a corresponding one of the air insulation layers.

15. The shiftable image sensor module of claim 1, wherein each of the air insulation layers is a visible light absorbing layer.

16. The shiftable image sensor module of claim 1, wherein at least four of the conducting wire units are disposed adjacently, a spacing between each adjacent two of the conducting wire units is Dc, and the following condition is satisfied:

$$0.01 \text{ mm} < Dc < 0.25 \text{ mm}.$$

17. The shiftable image sensor module of claim 16, wherein the spacing between the each adjacent two of the conducting wire units is Dc, and the following condition is satisfied:

$$0.02 \text{ mm} < Dc < 0.20 \text{ mm}.$$

18. A camera module, comprising:
the shiftable image sensor module of claim 1;
an imaging lens module configured for imaging an imaging light on the image sensor of the shiftable image sensor module; and
an optical image stabilization driver configured for providing a driving force for the image sensor to move relatively to the imaging lens module.

19. An electronic device, comprising:
the camera module of claim 18.

\* \* \* \* \*